(12) United States Patent
Todorović

(10) Patent No.: US 9,177,145 B2
(45) Date of Patent: Nov. 3, 2015

(54) MODIFIED FILE TRACKING ON VIRTUAL MACHINES

(75) Inventor: Rade Todorović, Abingdon (GB)

(73) Assignee: Sophos Limited, Abingdon (GB)

( * ) Notice: Subject to any disclaimer, the term of this patent is extended or adjusted under 35 U.S.C. 154(b) by 606 days.

(21) Appl. No.: 12/409,811

(22) Filed: Mar. 24, 2009

(65) Prior Publication Data

US 2010/0251363 A1 Sep. 30, 2010

(51) Int. Cl.
| | |
|---|---|
| *G06F 12/14* | (2006.01) |
| *G06F 21/56* | (2013.01) |
| *G06F 21/53* | (2013.01) |
| *G06F 9/455* | (2006.01) |

(52) U.S. Cl.
CPC .......... *G06F 21/566* (2013.01); *G06F 9/45558* (2013.01); *G06F 21/53* (2013.01); *G06F 21/56* (2013.01); *G06F 2009/45587* (2013.01)

(58) Field of Classification Search
CPC ......... G06F 21/50; G06F 21/51; G06F 21/53; G06F 21/56–21/565; G06F 9/455
USPC ............. 726/22–24, 26; 713/187–188; 718/1; 711/6; 714/763
See application file for complete search history.

(56) References Cited

U.S. PATENT DOCUMENTS

| | | | | |
|---|---|---|---|---|
| 5,960,170 | A * | 9/1999 | Chen et al. ................ | 714/38.14 |
| 6,983,296 | B1 * | 1/2006 | Muhlestein et al. .......... | 707/705 |
| 7,523,500 | B1 * | 4/2009 | Szor et al. ...................... | 726/24 |
| 7,685,638 | B1 * | 3/2010 | Buches ........................... | 726/22 |
| 7,739,737 | B2 * | 6/2010 | Christodorescu et al. ...... | 726/24 |
| 7,797,748 | B2 * | 9/2010 | Zheng et al. .................... | 726/24 |
| 7,845,005 | B2 * | 11/2010 | Kelley et al. .................... | 726/22 |
| 7,845,008 | B2 * | 11/2010 | Waltermann et al. ........... | 726/24 |
| 7,861,302 | B1 * | 12/2010 | Raz et al. ........................ | 726/24 |
| 7,895,654 | B1 * | 2/2011 | Millard ............................ | 726/24 |
| 7,962,956 | B1 * | 6/2011 | Liao et al. ....................... | 726/22 |
| 8,041,958 | B2 * | 10/2011 | Challener et al. .............. | 713/188 |
| 8,402,529 | B1 * | 3/2013 | Green et al. .................... | 726/11 |
| 8,458,695 | B2 * | 6/2013 | Fitzgerald et al. ................ | 718/1 |
| 8,516,478 | B1 * | 8/2013 | Edwards et al. .................. | 718/1 |
| 8,621,610 | B2 * | 12/2013 | Oberheide et al. .............. | 726/22 |
| 2005/0132368 | A1 * | 6/2005 | Sexton et al. ...................... | 718/1 |
| 2006/0021041 | A1 * | 1/2006 | Challener et al. ............... | 726/24 |
| 2006/0026218 | A1 * | 2/2006 | Urmston ....................... | 707/204 |
| 2006/0112342 | A1 * | 5/2006 | Bantz et al. ..................... | 715/736 |
| 2006/0136720 | A1 * | 6/2006 | Armstrong et al. ........... | 713/164 |
| 2006/0200863 | A1 * | 9/2006 | Ray et al. ......................... | 726/24 |
| 2006/0218637 | A1 * | 9/2006 | Thomas et al. .................. | 726/23 |
| 2008/0134178 | A1 * | 6/2008 | Fitzgerald et al. ................ | 718/1 |
| 2008/0178290 | A1 * | 7/2008 | Besch et al. .................... | 726/22 |
| 2008/0244114 | A1 * | 10/2008 | Schluessler et al. ........... | 710/24 |
| 2008/0263658 | A1 * | 10/2008 | Michael et al. ................. | 726/22 |
| 2009/0007100 | A1 * | 1/2009 | Field et al. ........................ | 718/1 |
| 2009/0055693 | A1 * | 2/2009 | Budko et al. .................... | 714/57 |
| 2009/0158432 | A1 * | 6/2009 | Zheng et al. .................... | 726/24 |

(Continued)

FOREIGN PATENT DOCUMENTS

GB 2122777 A * 1/1984

*Primary Examiner* — Eric W Shepperd
(74) *Attorney, Agent, or Firm* — Strategic Patents, P.C.

(57) ABSTRACT

In embodiments of the present invention improved capabilities are described for tracking modified files on a virtual machine including the steps of identifying an altered disk sector, associating the altered disk sector with code that is operated in a virtual machine, and causing a malicious code scan to be performed on the code.

18 Claims, 6 Drawing Sheets

(56) References Cited

U.S. PATENT DOCUMENTS

2009/0216975 A1* 8/2009 Halperin et al. ............... 711/162
2009/0249484 A1* 10/2009 Howard et al. ................. 726/24
2009/0293057 A1* 11/2009 Larkin et al. ..................... 718/1
2010/0083381 A1* 4/2010 Khosravi et al. ............... 726/24
2010/0115621 A1* 5/2010 Staniford et al. ............... 726/25
2010/0138924 A1* 6/2010 Heim et al. ..................... 726/24
2010/0169948 A1* 7/2010 Budko et al. ..................... 726/1
2010/0191784 A1* 7/2010 Sobel et al. ................... 707/823
2010/0199351 A1* 8/2010 Protas ............................ 726/25

* cited by examiner

MODIFIED FILE TRACKING ON VIRTUAL MACHINES

BACKGROUND

1. Field

The present invention is related to computer configuration, and more specifically to the sharing of information between virtual machines.

2. Description of the Related Art

A computer, as a physical computing machine, may be partitioned or multiplexed into a plurality of virtual computing machines, where each virtual computing machine runs its own operating system. One of the reasons for implementing a virtual computing machine configuration is to establish multiple isolated virtual machines on a single hardware platform. In order to maintain isolation amongst these virtual machines, there is typically no sharing of information or software resources between the virtual machines. However, since all virtual machines on a given physical platform must ultimately share the same hardware resources, such as processing and physical memory resources, there may be limits to how many virtual machines may accommodated on a single physical platform. Today's computing systems, such as server systems, may have requirements for implementing a virtual computing machine configuration with numbers of virtual computing machines beyond what is currently practical especially in terms of security software and associated processing duplication for each virtual machine. There exists a need for techniques that increase the number of virtual computing machines that may be accommodated on a single physical computing machine platform.

SUMMARY

In embodiments of the present invention, improved methods are described for presenting a physical computing machine including a virtual computer machine monitor and a one or more of virtual computing machines, where each of the virtual computing machines runs its own operating system, presenting one of the multiple virtual computing machines as a host, and the remaining multiple virtual computing machines as guests, and sharing information related to threat management between at least two of the virtual computing machines including the host, the virtual computer machine monitor, a first guest, and a second guest.

In embodiments, the method may include multiple virtual computing machines on multiple physical machines and information may be shared between virtual machines on different computing machines. In embodiments, the virtual computing machine monitor may be a hypervisor, a software program that may provide virtualization of number of virtual computer machines. Further, in embodiments, the virtual computing machine monitor may run directly on a physical computing machine, in association with an operating system. The physical computing machine may be a client, a server, or some other type of physical computing machine.

In embodiments, the sharing of information may be through a sharing facility. The sharing facility may communicate sharing of information directly between virtual computing machines including the host, the virtual computer machine monitor, the first guest, and the second guest. The sharing facility may be a software program with allocated memory. Further, the software program may run on the host, the physical computing machine that may not be a part of virtual computing machine. The allocated memory may be a part of the physical memory. Further, the part of physical memory may be allocated to the host. In embodiments, the sharing facility may store the sharing of information between two or more virtual computing machines including the host, the virtual computer machine monitor, the first guest, and the second guest. In embodiments, the sharing of information between two or more virtual computing machines may conserve a resource in either of the two or more virtual machines. The resource may be conserved through a consolidated memory. Further, the memory usage may be physical memory allocation to the virtual memory of the virtual computing machine. In embodiments, the conserved resource may be a processing resource. Further, the processing resource may be a processing time or removal of a processing requirement on one or more virtual machines. The processing resource may be reduction of processing requirement.

In embodiments, sharing information may be associated with a computer security facility. The computer security facility may be minimized within one or more virtual machines. Further, the computer security may be provided in part from outside the virtual computing machine. In embodiments, the computer security facility may be eliminated within one or more virtual machines and the computer security facility may be provided from outside the virtual machine. In embodiments, the computer security facility may be associated with a client firewall. Further, the client firewall may be minimized within a virtual machine. Furthermore, the client firewall may be provided in part provided from outside the virtual machine. In embodiments, the computer security facility may be eliminated from one or more virtual computing machines. Further, the computer security facility may be provided from outside the virtual computing machine. In embodiments, the computer security facility may be associated with network access control. The network access control may be associated with securing one or more virtual machines prior to the network. The network access control may be minimized within the virtual computing machine. Further, the network access control may be provided in part from outside the network. In embodiments, the network access control may be eliminated within a virtual computing machine and may be provided from outside the virtual computing machine. In embodiments, the sharing information may be associated with malware security and control. The malware security and control may not be included as a part of one or more of the virtual computing machines. In embodiments, the malware security and control scanning time may be reduced by offsetting the scans that may be associated with one or more of virtual computing machines. In embodiments, the malware security and control scanning results may be shared between one or more host, the virtual computer machine monitor, the first guest, and the second guest. Further, the sharing information relating to malware security and control may enable the first virtual machine to not replicate scanning that may have been previously executed on the second virtual machine.

In embodiments, the sharing information may be associated with configuration information. The configuration information may be associated with firewall configuration information, operating system configuration information, application configuration information, shared settings or some other type of configuration information. The firewall configuration information may be associated with an application rule, a firewall rule, a quarantine rule, a network bridge, a network access or some other type of firewall configuration information. The operating system configuration system may be associated with a process management, a memory management, a disk and file management, networking, security, a graphical a user interface, a device drivers or some other type of operating system configuration. The application configuration information may be associated with product engineering software, enterprise infrastructure software, information software, content access software, simulation software, educational software, media development software, product engineering software or some other type of application configuration information. The configuration information may be associated with shared settings. The shared setting may enable identical firewall settings or identical configuration settings for multiple virtual machines. Further, the shared settings may be associated with a computer security facility, client firewall, network access control or some other type of shared settings. Furthermore, the network access control may be associated with securing one or more virtual machines prior to network connection. In embodiments, the identical configuration settings may be set upon virtual machine creation. In addition, the identical configuration settings may be set when subsequent configuration changes are made in to the host machine. Further, the subsequent configuration changes may be made in association with a policy.

In embodiments, the sharing information may be associated with state information. The state information may be associated with scanned files, security and control information associated with a file system common between virtual computing machines, operating system, application software, software testing or some other type of state information. In embodiments, the scanned files may be scanned from inside or outside the virtual computing machine. In embodiments, the operating system state information may be associated with comparing operating system states between two or more of the host, the virtual computer machine monitor, the first guest, and the second guest.

In embodiments, the sharing information may be associated with malware detection information. The malware detection information is associated with the examination of files. Further, in embodiments, the examination of files may be associated with malware dictionary of known malware, scanning the file, deleting the file, quarantining the file, repairing the file or some other type of examination of files. Furthermore, the use of the malware dictionary may be associated with comparisons between values from the file and entries in the malware dictionary. In embodiments, malware detection information may be associated with the identification of suspicious behavior from a computer program, the detection of one or more of a virus, worm, phishing attacks, rootkits, Trojan horses, spyware, malware and the like. Further, in embodiments, identification of suspicious behavior may include monitoring the computer program.

In embodiments of the present invention, an improved method is described for presenting a physical computing machine including a virtual computer machine monitor and multiple virtual computing machines, where each of the multiple virtual computing machines may run its own operating system, presenting one of the multiple virtual computing machines as a host, and the remaining multiple virtual computing machines as guests, providing one or more of the guest virtual computer machines as a protected environment, where the protected environment may be used to isolate suspicious files from one or more of the host and other guest virtual computing machines, and communicating suspicious file information from one or more of the host and guest machines to the protected environment virtual machine for isolation.

In embodiments, the virtual machine may act as a sandbox. Further, the sandbox may run an executable code in simulation. Furthermore, when the simulation terminates, errors may be identified or changes may be searched for and may be analyzed for indications of malware.

In embodiments, the protected environment may be used for testing. In embodiments, the protected environment may be associated with malware detection. Further, the protected environment may be launched to scan a file. In addition, the isolated suspicious files may be observed for a period of time. In embodiment, the malware detection may be associated with the examination of files, repairing the file, quarantining the file, deleting the file or some other type of examination of file. Furthermore, in embodiments, the examination of files may be associated with a malware dictionary of known malware. The use of the malware dictionary is associated with comparisons between values from the file and entries in the malware dictionary. In embodiments, the malware detection may be associated with the identification of suspicious behavior from the computer program or detection of one or more of a virus, worm, phishing attacks, rootkits, Trojan horses, spyware, malware and the like. Further, the identification of suspicious behavior may include monitoring the computer program.

In embodiments, information may be shared between the virtual machine as the protected environment and one or more virtual computing machines including the host, the virtual computer machine monitor, and the guest. In embodiments, the virtual computing machines may be on a second physical computing machine. In embodiments, the shared information is associated with state information. Further, in embodiments, the shared information may be with scanned files. Furthermore, the scanned files may be scanned from inside or outside the virtual computing machine In an aspect of the invention, a system, a method and computer program product embodied in a computer readable medium that, when executing on one or more computers, may perform the steps of identifying an altered disk sector, associating the altered disk sector with data that are operated in a virtual machine, and causing a malicious code scan to be performed on the data. The step of identification may be performed by examination of a dirty cluster map. The data may be at least one of a file, code, an executable file, a software application, and interpretable content.

In an aspect of the invention, a system, a method and a computer program product embodied in a computer readable medium that, when executing on one or more computers, may perform the steps of identifying an altered disk sector, associating the altered disk sector with data that are operated in a virtual machine, and causing a malicious code scan to be performed on an operating system within the virtual machine based at least in part of finding that the data have been corrupted by malicious code. The step of identification may be performed by examination of a dirty cluster map. The data may be at least one of a file, code, an executable file, a software application, and interpretable content.

In an aspect of the invention, a system, a method and a computer program product embodied in a computer readable medium that, when executing on one or more computers, may perform the steps of identifying an altered disk sector, associating the altered disk sector with data that are operated in a virtual machine, and causing a malicious code scan to be performed on a plurality of files within the virtual machine based at least in part on a finding that the data have been corrupted by malicious code. The step of identification may be performed by examination of a dirty cluster map. The data may be at least one of a file, code, an executable file, a software application, and interpretable content.

In an aspect of the invention, a system, a method and a computer program product embodied in a computer readable medium that, when executing on one or more computers, may perform the steps of identifying an altered disk sector, associating the altered disk sector with code that is operated in a virtual machine, and causing a malicious code scan to be performed on a file generated by the code. The file generated by the code may be within the virtual machine. The file generated by the code may be outside of the virtual machine. The step of identification may be performed by examination of a dirty cluster map. The code may be at least one of a file, an executable file, a software application, and interpretable content. The dirty cluster map may be a file that holds information about modified clusters on the virtual machine.

In an aspect of the invention, a system, a method and a computer program product embodied in a computer readable medium that, when executing on one or more computers, may perform the steps of identifying an altered disk sector, associating the altered disk sector with data that are operated in a virtual machine, causing a code scan to be performed on the date; and in response to identifying that an acceptable change has been made to the data, causing an indication to be made representing the fact that similar changes may be desirable in other virtual machines. Multiple replica virtual machines may exist on a platform and the indication of the acceptable change in one virtual machine may indicate that the same change should be made in other replica virtual machines. The step of identification may be performed by examination of a dirty cluster map. The data may be at least one of a file, code, an executable file, a software application, and interpretable content. The dirty cluster map may be a file that holds information about modified clusters on the virtual machine.

These and other systems, methods, objects, features, and advantages of the present invention will be apparent to those skilled in the art from the following detailed description of the preferred embodiment and the drawings. All documents mentioned herein are hereby incorporated in their entirety by reference.

BRIEF DESCRIPTION OF THE FIGURES

The invention and the following detailed description of certain embodiments thereof may be understood by reference to the following figures.

While the invention has been described in connection with certain preferred embodiments, other embodiments would be understood by one of ordinary skill in the art and are encompassed herein.

All documents referenced herein are hereby incorporated by reference.

DETAILED DESCRIPTION

Figure 1:
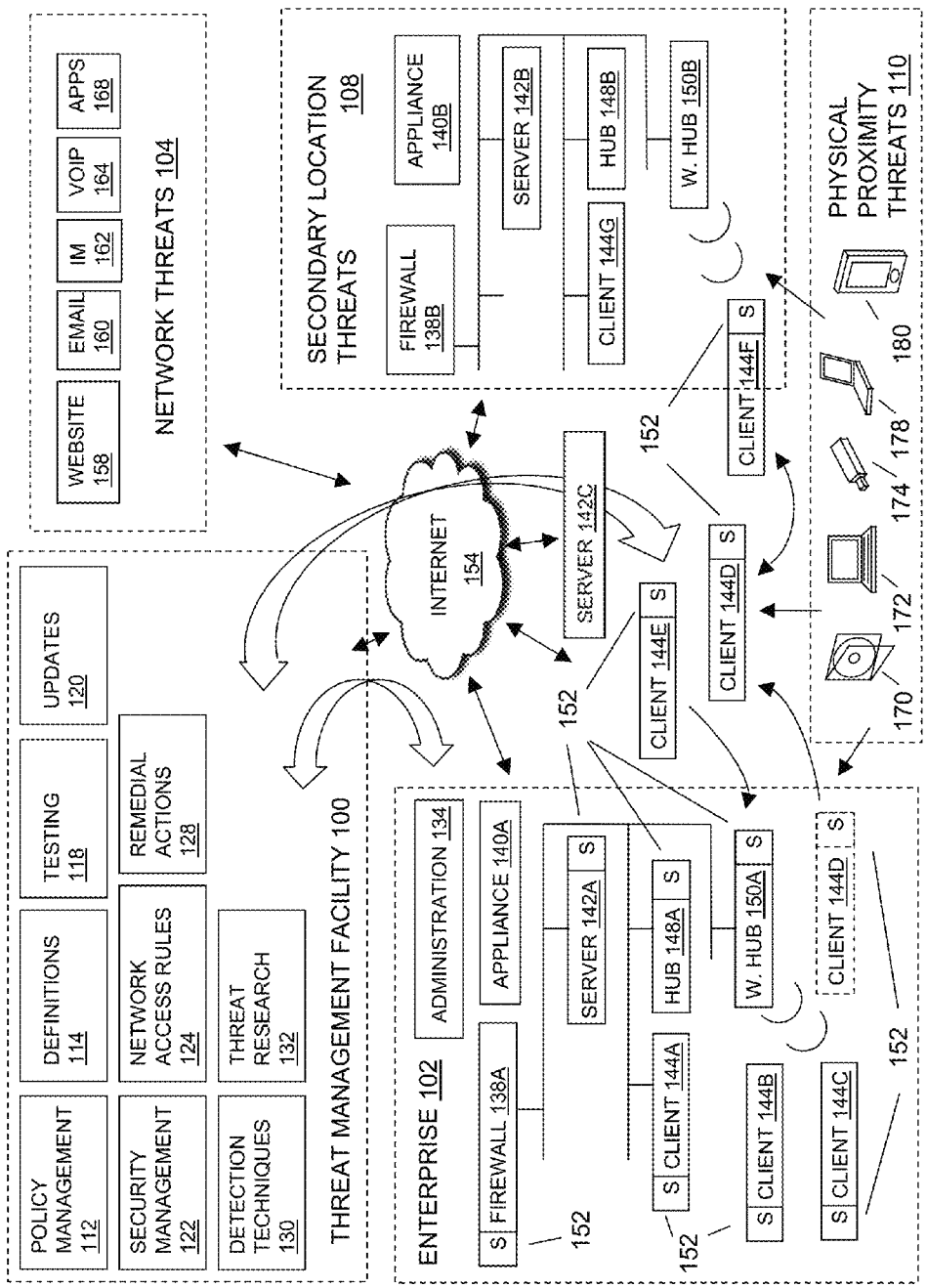
FIG. 1 depicts a block diagram of the threat management facility providing protection to an enterprise against a plurality of threats.

FIG. 1 depicts a block diagram of a threat management facility providing protection to an enterprise against a plurality of threats. An aspect of the present invention relates to corporate policy management and implementation through a unified threat management facility 100. As will be explained in more detail below, a threat management facility 100 is used to protect computer assets from many threats, both computer-generated threats and user-generated threats. The threat management facility 100 is multi-dimensional in that it is designed to protect corporate assets from a variety of threats and it is adapted to learn about threats in one dimension (e.g. worm detection) and apply the knowledge in another dimension (e.g. spam detection). Corporate policy management is one of the dimensions for which the threat management facility can control. The corporation may institute a policy that prevents certain people (e.g. employees, groups of employees, types of employees, guest of the corporation, etc.) from accessing certain types of computer programs. For example, the corporation may elect to prevent its accounting department from using a particular version of an instant messaging service or all such services. In this example, the policy management facility 112 may be used to update the policies of all corporate computing assets with a proper policy control facility or it may update a select few. By using the threat management facility 100 to facilitate the setting, updating and control of such policies the corporation only needs to be concerned with keeping the threat management facility 100 up to date on such policies. The threat management facility 100 can take care of updating all of the other corporate computing assets.

It should be understood that the threat management facility 100 may provide multiple services and policy management may be offered as one of the services. We will now turn to a description of the threat management system 100

Over recent years, malware has become a major problem across the internet 154. From both technical and user perspectives, the categorization of a specific threat type, whether as virus, worm, spam, phishing exploration, spyware, adware, or the like, is becoming reduced in significance. The threat, no matter how it's categorized, may need to be stopped at all points of the enterprise facility 102, including laptop, desktop, server facility 142, gateway, and the like. Similarly, there may be less and less benefit to the user in having different solutions for known and unknown threats. As such, a consolidated threat management facility 100 may need to be applied to the same set of technologies and capabilities for all threats. The threat management facility 100 may provide a single agent on the desktop, and a single scan of any suspect file. This approach may eliminate the inevitable overlaps and gaps in protection caused by treating viruses and spyware as separate problems, while simultaneously simplifying administration and minimizing desktop load. As the number and range of types of threats has increased, so may have the level of connectivity available to all IT users. This may have lead to a rapid increase in the speed at which threats may move. Today, an unprotected PC connected to the internet 154 may be infected quickly (perhaps within 10 minutes) which may require acceleration for the delivery of threat protection. Where once monthly updates may have been sufficient, the threat management facility 100 may automatically and seamlessly update its product set against spam and virus threats quickly, for instance, every five minutes, every minute, continuously, or the like. Analysis and testing may be increasingly automated, and also may be performed more frequently; for instance, it may be completed in 15 minutes, and may do so without compromising quality. The threat management facility 100 may also extend techniques that may have been developed for virus and malware protection, and provide them to enterprise facility 102 network administrators to better control their environments. In addition to stopping malicious code, the threat management facility 100 may provide policy management that may be able to control legitimate applications, such as VoIP, instant messaging, peer-to-peer file-sharing, and the like, that may undermine productivity and network performance within the enterprise facility 102.

The threat management facility 100 may provide an enterprise facility 102 protection from computer-based malware, including viruses, spyware, adware, Trojans, intrusion, spam, policy abuse, uncontrolled access, and the like, where the enterprise facility 102 may be any entity with a networked computer-based infrastructure. In an embodiment, FIG. 1 may depict a block diagram of the threat management facility providing protection to an enterprise against a plurality of threats. The enterprise facility 102 may be corporate, commercial, educational, governmental, or the like, and the enterprise facility's 102 computer network may be distributed amongst a plurality of facilities, and in a plurality of geographical locations. The threat management facility 100 may include a plurality of functions, such as security management facility 122, policy management facility 112, update facility 120, definitions facility 114, network access rules facility 124, remedial action facility 128, detection techniques facility 130, testing facility 118, threat research facility 132, and the like. In embodiments, the threat protection provided by the threat management facility 100 may extend beyond the network boundaries of the enterprise facility 102 to include client facility's 144 that have moved into network connectivity not directly associated or controlled by the enterprise facility 102. Threats to enterprise facility 102 client facilities 144 may come from a plurality of sources, such as from network threats 104, physical proximity threats 110, secondary location threats 108, and the like. In embodiments, the threat management facility 100 may provide an enterprise facility 102 protection from a plurality of threats to multiplatform computer resources in a plurality of locations and network configurations, with an integrated system approach.

In embodiments, the threat management facility 100 may be provided as a stand-alone solution. In other embodiments, the threat management facility 100 may be integrated into a third-party product. An application programming interface (e.g. a source code interface) may be provided such that the threat management facility 100 may be integrated. For instance, the threat management facility 100 may be stand-alone in that it provides direct threat protection to an enterprise or computer resource, where protection is subscribed to directly 100. Alternatively, the threat management facility may offer protection indirectly, through a third-party product, where an enterprise may subscribe to services through the third-party product, and threat protection to the enterprise may be provided by the threat management facility 100 through the third-party product.

The security management facility 122 may include a plurality of elements that provide protection from malware to enterprise facility 102 computer resources, including endpoint security and control, email security and control, web security and control, reputation-based filtering, control of unauthorized users, control of guest and non-compliant computers, and the like. The security management facility 122 may be a software application that may provide malicious code and malicious application protection to a client facility 144 computing resource. The security management facility 122 may have the ability to scan the client facility 144 files for malicious code, remove or quarantine certain applications and files, prevent certain actions, perform remedial actions and perform other security measures. In embodiments, scanning the client facility 144 may include scanning some or all of the files stored to the client facility 144 on a periodic basis, may scan applications once the application has been requested to execute, may scan files as the files are transmitted to or from the client facility 144, or the like. The scanning of the applications and files may be to detect known malicious code or known unwanted applications. In an embodiment, new malicious code and unwanted applications may be continually developed and distributed, and updates to the known code database may be provided on a periodic basis, on a demand basis, on an alert basis, or the like.

In an embodiment, the security management facility 122 may provide for email security and control, where security management may help to eliminate spam, viruses, spyware and phishing, control of email content, and the like. The security management facilities 122 email security and control may protect against inbound and outbound threats, protect email infrastructure, prevent data leakage, provide spam filtering, and the like. In an embodiment, security management facility 122 may provide for web security and control, where security management may help to detect or block viruses, spyware, malware, unwanted applications, help control web browsing, and the like, which may provide comprehensive web access control enabling safe, productive web browsing. Web security and control may provide internet use policies, reporting on suspect devices, security and content filtering, active monitoring of network traffic, URI filtering, and the like. In an embodiment, the security management facility 122 may provide for network access control, which may provide control over network connections. Network control may stop unauthorized, guest, or non-compliant systems from accessing networks, and may control network traffic that may not be bypassed from the client level. In addition, network access control may control access to virtual private networks (VPN), where VPNs may be a communications network tunneled through another network, establishing a logical connection acting as a virtual network. In embodiments, a VPN may be treated in the same manner as a physical network.

In an embodiment, the security management facility 122 may provide for host intrusion prevention through behavioral based protection, which may guard against unknown threats by analyzing behavior before software code executes. Behavioral based protection may monitor code when it runs and intervene if the code is deemed to be suspicious or malicious. Advantages of behavioral based protection over runtime protection may include code being prevented from running, whereas runtime protection may only interrupt code that has already partly executed; behavioral protection may identify malicious code at the gateway or on the file servers and deletes it before reaching end-point computers and the like.

In an embodiment, the security management facility 122 may provide for reputation filtering, which may target or identify sources of known malware. For instance, reputation filtering may include lists of URIs of known sources of malware or known suspicious IP addresses, or domains, say for spam, that when detected may invoke an action by the threat management facility 100, such as dropping them immediately. By dropping the source before any interaction can initiate, potential threat sources may be thwarted before any exchange of data can be made.

In embodiments, information may be sent from the enterprise back to a third party, a vendor, or the like, which may lead to improved performance of the threat management facility 100. For example, the types, times, and number of virus interactions that a client experiences may provide useful information for the preventions of future virus threats. This type of feedback may be useful for any aspect of threat detection. Feedback of information may also be associated with behaviors of individuals within the enterprise, such as being associated with most common violations of policy, network access, unauthorized application loading, unauthorized external device use, and the like. In embodiments, this type of information feedback may enable the evaluation or profiling of client actions that are violations of policy that may provide a predictive model for the improvement of enterprise policies.

In an embodiment, the security management facility 122 may provide for the overall security of the enterprise facility 102 network or set of enterprise facility 102 networks, may provide updates of malicious code information to the enterprise facility 102 network, and associated client facilities 144. The updates may be a planned update, an update in reaction to a threat notice, an update in reaction to a request for an update, an update based on a search of known malicious code information, or the like. The administration facility 134 may provide control over the security management facility 122 when updates are performed. The updates may be automatically transmitted without an administration facility's 134 direct control, manually transmitted by the administration facility 134, or the like. The security management facility 122 may include the management of receiving malicious code descriptions from a provider, distribution of malicious code descriptions to enterprise facility 102 networks, distribution of malicious code descriptions to client facilities 144, or the like. In an embodiment, the management of malicious code information may be provided to the enterprise facility's 102 network, where the enterprise facility's 102 network may provide the malicious code information through the enterprise facility's 102 network distribution system.

The threat management facility 100 may provide a policy management facility 112 that may be able to block non-malicious applications, such as VoIP 164, instant messaging 162, peer-to-peer file-sharing, and the like, that may undermine productivity and network performance within the enterprise facility 102. The policy management facility 112 may be a set of rules or policies that may indicate enterprise facility 102 access permissions for the client facility 144, such as access permissions associated with the network, applications, external computer devices, and the like. The policy management facility 112 may include a database, a text file, a combination of databases and text files, or the like. In an embodiment, a policy database may be a block list, a black list, an allowed list, a white list, or the like that may provide a list of enterprise facility 102 external network locations/applications that may or may not be accessed by the client facility 144. The policy management facility 112 may include rules that may be interpreted with respect to an enterprise facility 102 network access request to determine if the request should be allowed. The rules may provide a generic rule for the type of access that may be granted; the rules may be related to the policies of an enterprise facility 102 for access rights for the enterprise facility's 102 client facility 144. For example, there may be a rule that does not permit access to sporting websites. When a website is requested by the client facility 144, a security facility may access the rules within a policy facility to determine if the requested access is related to a sporting website. In an embodiment, the security facility may analyze the requested website to determine if the website matches with any of the policy facility rules.

The policy management facility 112 may be similar to the security management facility 122 but with the addition of enterprise facility 102 wide access rules and policies that may be distributed to maintain control of client facility 144 access to enterprise facility 102 network resources. The policies may be defined for application type, subset of application capabilities, organization hierarchy, computer facility type, user type, network location, time of day, connection type, or the like. Policies may be maintained by the administration facility 134, through the threat management facility 100, in association with a third party, or the like. For example, a policy may restrict IM 162 activity to only support personnel for communicating with customers. This may allow communication for departments requiring access, but may maintain the network bandwidth for other activities by restricting the use of IM 162 to only the personnel that need access to IM 162 in support of the enterprise facility 102. In an embodiment, the policy management facility 112 may be a stand-alone application, may be part of the network server facility 142, may be part of the enterprise facility 102 network, may be part of the client facility 144, or the like.

In embodiments, the threat management facility 100 may provide configuration management, which may be similar to policy management, but may specifically examine the configuration set of applications, operating systems, hardware, and the like, and managing changes to their configurations. Assessment of a configuration may be made against a standard configuration policy, detection of configuration changes, remediation of improper configuration, application of new configurations, and the like. An enterprise may keep a set of standard configuration rules and policies which may represent the desired state of the device. For example, a client firewall may be running and installed, but in the disabled state, where remediation may be to enable the firewall. In another example, the enterprise may set a rule that disallows the use of USB disks, and sends a configuration change to all clients, which turns off USB drive access via a registry.

In embodiments, the threat management facility 100 may also provide for the removal of applications that may interfere with the operation of the threat management facility 100, such as competitor products that may also be attempting similar threat management functions. The removal of such products may be initiated automatically whenever such products are detected. In the case where such applications are services are provided indirectly through a third-party product, the application may be suspended until action is taken to remove or disable the third-party product's protection facility.

Threat management against a sometimes quickly evolving malware environment may require timely updates, and the update management facility 120 may be provided by the threat management facility 100. In addition, a policy management facility 112 may also require update management (e.g. as provided by the update facility 120 herein described), as the enterprise facility 102 requirements for policies change enterprise facility 102, client facility 144, server facility 142 enterprise facility 102. The update management for the security facility 122 and policy management facility 112 may be provided directly by the threat management facility 100, such as by a hosted system or in conjunction with the administration facility 134. In embodiments, the threat management facility 100 may provide for patch management, where a patch may be an update to an operating system, an application, a system tool, or the like, where one of the reasons for the patch is to reduce vulnerability to threats.

In embodiments, the security facility 122 and policy management facility 112 may push information to the enterprise facility 102 network and/or client facility 144, the enterprise facility 102 network and/or client facility 144 may pull information from the security facility 122 and policy management facility 112 network server facilities 142, there may be a combination of pushing and pulling of information between the security facility 122 and the policy management facility 112 network servers 142, enterprise facility 102 network, and client facilities 144, or the like. For example, the enterprise facility 102 network and/or client facility 144 may pull information from the security facility 122 and policy management facility 112 network server facility 142 may request the information using the security facility 122 and policy management facility 112 update module; the request may be based on a certain time period, by a certain time, by a date, on demand, or the like. In another example, the security facility 122 and policy management facility 112 network servers 142 may push the information to the enterprise facility's 102 network and/or client facility 144 by providing notification that there are updates available for download and then transmitting the information. The combination of the security management 122 network server facility 142 and security update module may function substantially the same as the policy management facility 112 network server and policy update module by providing information to the enterprise facility 102 network and the client facility 144 in a push or pull method. In an embodiment, the policy management facility 112 and the security facility 122 management update modules may work in concert to provide all the needed information to the enterprise facility's 102 network and/or client facility 144 for control of application execution. In an embodiment, the policy update module and security update module may be combined into a single update module.

As threats are identified and characterized, the threat management facility 100 may create definition updates that may be used to allow the threat management facility 100 to detect and remediate the latest malicious software, unwanted applications, configuration and policy changes, and the like. The threat definition facility 114 may contain threat identification updates, also referred to as definition files. A definition file may be a virus identity file that may include definitions of known or potential malicious code. The virus identity (IDE) definition files may provide information that may identify malicious code within files, applications, or the like. The definition files may be accessed by security management facility 122 when scanning files or applications within the client facility 144 for the determination of malicious code that may be within the file or application. The definition files may contain a number of commands, definitions, or instructions, to be parsed and acted upon, or the like. In embodiments, the client facility 144 may be updated with new definition files periodically to provide the client facility 144 with the most recent malicious code definitions; the updating may be performed on a set time period, may be updated on demand from the client facility 144, may be updated on demand from the network, may be updated on a received malicious code alert, or the like. In an embodiment, the client facility 144 may request an update to the definition files from an update facility 120 within the network, may request updated definition files from a computing facility external to the network, updated definition files may be provided to the client facility 114 from within the network, definition files may be provided to the client facility 144 from an external computing facility from an external network, or the like.

In an embodiment, a definition management facility 114 may provide for the timely updates of definition files information to the network, client facilities 144, and the like. New and altered malicious code and malicious applications may be continually created and distributed to networks worldwide. The definition files that maintain the definitions of the malicious code and malicious application information for the protection of the networks and client facilities 144 may need continual updating to provide continual defense of the network and client facility 144 from the malicious code and malicious applications. The definition files management may provide for automatic and manual methods of updating the definition files. In embodiments, the network may receive definition files and distribute the definition files to the network client facilities 144, the client facilities 144 may receive the definition files directly, or the network and client facilities 144 may both receive the definition files, or the like. In an embodiment, the definition files may be updated on a fixed periodic basis, on demand by the network and/or the client facility 144, as a result of an alert of a new malicious code or malicious application, or the like. In an embodiment, the definition files may be released as a supplemental file to an existing definition files to provide for rapid updating of the definition files.

In a similar manner, the security management facility 122 may be used to scan an outgoing file and verify that the outgoing file is permitted to be transmitted per the enterprise facility 102 rules and policies. By checking outgoing files, the security management facility 122 may be able discover malicious code infected files that were not detected as incoming files as a result of the client facility 144 having been updated with either new definition files or policy management facility 112 information. The definition files may discover the malicious code infected file by having received updates of developing malicious code from the administration facility 134, updates from a definition files provider, or the like. The policy management facility 112 may discover the malicious code infected file by having received new updates from the administration facility 134, from a rules provider, or the like.

The threat management facility 100 may provide for a way to control access to the enterprise facility 102 networks. For instance, the enterprise facility 102 may want to restrict access to certain applications, networks, files, printers, servers, databases, or the like. In addition, the enterprise facility 102 may want to restrict user access under certain conditions, such as the user's location, usage history, need to know, job position, connection type, time of day, method of authentication, client-system configuration, or the like. Network access rules may be developed by the enterprise facility 102, or pre-packaged by a supplier, and managed by the threat management facility 100 in conjunction with the administration facility 134. Network access rules and control may be responsible for determining if a client facility 144 application should be granted access to a requested network location. The network location may be on the same network as the facility or may be on another network. In an embodiment, the network access control may verify access rights for client facilities 144 from within the network or may verify access rights of computer facilities from external networks. When network access for a client facility 144 is denied, the network access control may send an information file to the client facility 144, the information file may contain data or commands that may provide instructions for the remedial action facility 128. The information sent by the network access facility 124 control may be a data file. The data file may contain a number of commands, definitions, instructions, or commands to be parsed and acted upon through the remedial action facility 128, or the like. The information sent by the network access facility 124 control may be a command or command file that the remedial action facility 128 may access and take action upon.

In an embodiment, the network access rules 124 may provide an information store to be accessed by the network access control. The network access rules facility 124 may include databases such as a block list, a black list, an allowed list, a white list, an unacceptable network site database, an acceptable network site database, a network site reputation database, or the like of network access locations that may or may not be accessed by the client facility 144. Additionally, the network access rules facility 124 may incorporate rule evaluation; the rule evaluation may parse network access requests and apply the parsed information to network access rules. The network access rule facility 124 may have a generic set of rules that may be in support of an enterprise facility's 102 network access policies, such as denying access to certain types of websites 158, controlling instant messenger 162 accesses, or the like. Rule evaluation may include regular expression rule evaluation, or other rule evaluation method for interpreting the network access request and comparing the interpretation to the established rules for network access. In an embodiment, the network access rules facility 124 may receive a rules evaluation request from the network access control and may return the rules evaluation to the network access control.

Similar to the threat definitions facility 114, the network access rule facility 124 may provide updated rules and policies to the enterprise facility 102. The network access rules facility 124 may be maintained by the network administration facility 134, using network access rules facility 124 management. In an embodiment, the network administration facility 134 may be able to maintain a set of access rules manually by adding rules, changing rules, deleting rules, or the like. Additionally, the administration facility 134 may be able to retrieve predefined rule sets from a provider that may provide a set of rules to be applied to an entire enterprise facility 102. The network administration facility 134 may be able to modify the predefined rules as needed for a particular enterprise facility 102 using the network access rules management facility 124.

When a threat or policy violation is detected by the threat management facility 100, the threat management facility 100 may provide for a remedial action facility 128. Remedial action may take a plurality of forms, such as terminating or modifying an ongoing process or interaction, sending a warning to a client or administration facility 134 of an ongoing process or interaction, executing a program or application to remediate against a threat or violation, record interactions for subsequent evaluation, or the like. Remedial action may be associated with an application that responds to information that a client facility 144 network access request has been denied. In an embodiment, when the data file is received, remedial action may parse the data file, interpret the various aspects of the data file, and act on the parsed data file information to determine actions to be taken on an application requesting access to a denied network location. In an embodiment, when the data file is received, remedial action may access the threat definitions to parse the data file and determine an action to be taken on an application requesting access to a denied network location. In an embodiment, the information received from the facility may be a command or a command file. The remedial action facility may carry out any commands that are received or parsed from a data file from the facility without performing any interpretation of the commands. In an embodiment, the remedial action facility may interact with the received information and may perform various actions on a client requesting access to a denied network location. The action may be one or more of continuing to block all requests to a denied network location, a malicious code scan on the application, a malicious code scan on the client facility 144, quarantine of the application, terminating the application, isolation of the application, isolation of the client facility 144 to a location within the network that restricts network access, blocking a network access port from a client facility 144, reporting the application to a administration facility 134, or the like.

Remedial action may be provided as a result of a detection of a threat or violation. The detection techniques facility 130 may include monitoring the enterprise facility 102 network or end-point devices, such as by monitoring streaming data through the gateway, across the network, through routers and hubs, and the like. The detection techniques facility 130 may include monitoring activity and stored files on computing facilities, such as on server facilities 142, desktop computers, laptop computers, other mobile computing devices, and the like. Detection techniques, such as scanning a computer's stored files, may provide the capability of checking files for stored threats, either in the active or passive state. Detection techniques, such as streaming file management, may provide the capability of checking files received at the network, gateway facility, client facility 144, and the like. This may provide the capability of not allowing a streaming file or portions of the streaming file containing malicious code from entering the client facility 144, gateway facility, or network. In an embodiment, the streaming file may be broken into blocks of information, and a plurality of virus identities may be used to check each of the blocks of information for malicious code. In an embodiment, any blocks that are not determined to be clear of malicious code may not be delivered to the client facility 144, gateway facility, or network.

Verifying that the threat management facility 100 is detecting threats and violations to established policy, may require the ability to test the system, either at the system level or for a particular computing component. The testing facility 118 may allow the administration facility 134 to coordinate the testing of the security configurations of client facility 144 computing facilities on a network. The administration facility 134 may be able to send test files to a set of client facility 144 computing facilities to test the ability of the client facility 144 to determine acceptability of the test file. After the test file has been transmitted, a recording facility may record the actions taken by the client facility 144 in reaction to the test file. The recording facility may aggregate the testing information from the client facility 144 and report the testing information to the administration facility 134. The administration facility 134 may be able to determine the level of preparedness of the client facility 144 computing facilities by the reported information. Remedial action may be taken for any of the client facility 144 computing facilities as determined by the administration facility 134; remedial action may be taken by the administration facility 134 or by the user of the client facility 144.

The threat research facility 132 may provide a continuously ongoing effort to maintain the threat protection capabilities of the threat management facility 100 in light of continuous generation of new or evolved forms of malware. Threat research may include researchers and analysts working on known and emerging malware, such as viruses, rootkits a spyware, as well as other computer threats such as phishing, spam, scams, and the like. In embodiments, through threat research, the threat management facility 100 may be able to provide swift, global responses to the latest threats.

The threat management facility 100 may provide threat protection to the enterprise facility 102, where the enterprise facility 102 may include a plurality of networked components, such as client facility 144, server facility 142, administration facility 134, firewall 138, gateway, hubs 148, routers, threat management appliance 140, desktop users, mobile users, and the like. In embodiments, it may be the end-point computer security facility 152, located on a computer's desktop, which may provide threat protection to a user, and associated enterprise facility 102. In embodiments, the term end-point may refer to a computer system that may source data, receive data, evaluate data, buffer data, or the like (such as a user's desktop computer as an end-point computer), a firewall as a data evaluation end-point computer system, a laptop as a mobile end-point computer, a PDA as a hand-held end-point computer. In embodiments, end-point may refer to a source or destination for data, including such components where the destination is characterized by an evaluation point for data, and where the data may be sent to a subsequent destination after evaluation. The end-point computer security facility 152 may be an application loaded onto the computer platform or computer support component, where the application may accommodate the plurality of computer platforms and/or functional requirements of the component. For instance, a client facility 144 computer may be one of a plurality of computer platforms, such as Windows, Macintosh, Linux, and the like, where the end-point computer security facility 152 may be adapted to the specific platform, while maintaining a uniform product and product services across platforms. Additionally, components may have different functions to serve within the enterprise facility's 102 networked computer-based infrastructure. For instance, computer support components provided as hubs 148, routers, server facility 142, firewalls 138, and the like, may require unique security application software to protect their portion of the system infrastructure, while providing an element in an integrated threat management system that extends out beyond the threat management facility 100 to incorporate all computer resources under its protection.

The enterprise facility 102 may include a plurality of client facility 144 computing platforms on which the end-point computer security facility 152 is adapted. A client facility 144 computing platform may be a computer system that is able to access a service on another computer, such as a server facility 142, via a network. This client facility 144 server facility 142 model may apply to a plurality of networked applications, such as a client facility 144 connecting to an enterprise facility 102 application server facility 142, a web browser client facility 144 connecting to a web server facility 142, an e-mail client facility 144 retrieving e-mail from an internet 154 service provider's mail storage servers 142, and the like. In embodiments, traditional large client facility 144 applications may be switched to websites, which may increase the browser's role as a client facility 144. Clients 144 may be classified as a function of the extent to which they perform their own processing. For instance, client facilities 144 are sometimes classified as a fat client facility 144 or thin client facility 144. The fat client facility 144, also known as a thick client facility 144 or rich client facility 144, may be a client facility 144 that performs the bulk of data processing operations itself, and does not necessarily rely on the server facility 142. The fat client facility 144 may be most common in the form of a personal computer, where the personal computer may operate independent of any server facility 142. Programming environments for fat clients 144 may include CURI, Delphi, Droplets, Java, win32, X11, and the like. Thin clients 144 may offer minimal processing capabilities, for instance, the thin client facility 144 may primarily provide a graphical user interface provided by an application server facility 142, which may perform the bulk of any required data processing. Programming environments for thin clients 144 may include JavaScript/AJAX, ASP, JSP, Ruby on Rails, Python's Django, PHP, and the like. The client facility 144 may also be a mix of the two, such as processing data locally, but relying on a server facility 142 for data storage. As a result, this hybrid client facility 144 may provide benefits from both the fat client facility 144 type, such as multimedia support and high performance, and the thin client facility 144 type, such as high manageability and flexibility. In embodiments, the threat management facility 100, and associated end-point computer security facility 152, may provide seamless threat protection to the plurality of clients 144, and client facility 144 types, across the enterprise facility 102.

The enterprise facility 102 may include a plurality of server facilities 142, such as application servers, communications servers, file servers, database servers, proxy servers, mail servers, fax servers, game servers, web servers, and the like. A server facility 142, which may also be referred to as a server facility 142 application, server facility 142 operating system, server facility 142 computer, or the like, may be an application program or operating system that accepts client facility 144 connections in order to service requests from clients 144. The server facility 142 application may run on the same computer as the client facility 144 using it, or the server facility 142 and the client facility 144 may be running on different computers and communicating across the network. Server facility 142 applications may be divided among server facility 142 computers, with the dividing depending upon the workload. For instance, under light load conditions all server facility 142 applications may run on a single computer and under heavy load conditions a single server facility 142 application may run on multiple computers. In embodiments, the threat management facility 100 may provide threat protection to server facilities 142 within the enterprise facility 102 as load conditions and application changes are made.

A server facility 142 may also be an appliance facility 140, where the appliance facility 140 provides specific services onto the network. Though the appliance facility 140 is a server facility 142 computer, that may be loaded with a server facility 142 operating system and server facility 142 application, the enterprise facility 102 user may not need to configure it, as the configuration may have been performed by a third party. In an embodiment, an enterprise facility 102 appliance may be a server facility 142 appliance that has been configured and adapted for use with the threat management facility 100, and located within the facilities of the enterprise facility 102. The enterprise facility's 102 threat management appliance may enable the enterprise facility 102 to administer an on-site local managed threat protection configuration, where the administration facility 134 may access the threat resources through an interface, such as a web portal. In an alternate embodiment, the enterprise facility 102 may be managed remotely from a third party, vendor, or the like, without an appliance facility 140 located within the enterprise facility 102. In this instance, the appliance functionality may be a shared hardware product between pluralities of enterprises 102. In embodiments, the appliance facility 140 may be located at the enterprise facility 102, where the enterprise facility 102 maintains a degree of control. In embodiments, a hosted service may be provided, where the appliance 140 may still be an on-site black box to the enterprise facility 102, physically placed there because of infrastructure requirements, but managed by a third party, vendor, or the like.

Simple server facility 142 appliances may also be utilized across the enterprise facility's 102 network infrastructure, such as switches, routers, wireless routers, hubs 148, gateways, print servers 142, net modems, and the like. These simple server facility appliances may not require configuration by the enterprise facility 102, but may require protection from threats via an end-point computer security facility 152. These appliances may provide interconnection services within the enterprise facility 102 network, and therefore may advance the spread of a threat if not properly protected.

One way for a client facility 144 to be protected from threats from within the enterprise facility 102 network may be a personal firewall. A personal firewall may be an application that controls network traffic to and from a client, permitting or denying communications based on a security policy. Personal firewalls may be designed for use by end-users, which may result in protection for only the computer on which it's installed. Personal firewalls may be able to control network traffic by providing prompts each time a connection is attempted and adapting security policy accordingly. Personal firewalls may also provide some level of intrusion detection, which may allow the software to terminate or block connectivity where it suspects an intrusion is being attempted. Other features that may be provided by a personal firewall may include alerts about outgoing connection attempts, control of program access to networks, hiding the client from port scans by not responding to unsolicited network traffic, monitoring of applications that may be listening for incoming connections, monitoring and regulation of incoming and outgoing network traffic, prevention of unwanted network traffic from installed applications, reporting applications that make connection attempts, reporting destination servers with which applications may be attempting communications, and the like. In embodiments, the personal firewall may be provided by the threat management facility 100.

Another important component that may be protected by an end-point computer security facility 152 is a network firewall facility 138, which may be a hardware or software device that may be configured to permit, deny, or proxy data through a computer network that has different levels of trust in its source of data. For instance, an internal enterprise facility 102 network may have a high level of trust, because the source of all data has been sourced from within the enterprise facility 102. An example of a low level of trust is the Internet 154, because the source of data may be unknown. A zone with an intermediate trust level, situated between the Internet 154 and a trusted internal network, may be referred to as a "perimeter network". Since firewall facilities 138 represent boundaries between threat levels, the end-point computer security facility 152 associated with the firewall facility 138 may provide resources that may control the flow of threats at this enterprise facility 102 network entry point. Firewall facilities 138, and associated end-point computer security facility 152, may also be associated with a network node that may be equipped for interfacing between networks that use different protocols. In embodiments, the end-point computer security facility 152 may provide threat protection in a plurality of network infrastructure locations, such as at the enterprise facility 102 network entry point, i.e. the firewall facility 138 or gateway; at the server facility 142; at distribution points within the network, i.e. the routers and hubs 148; at the desktop of client facility 144 computers; and the like. In embodiments, the most effective location for threat detection may be at the user's computer desktop end-point computer security facility 152.

The interface between the threat management facility 100 and the enterprise facility 102, and through the appliance facility 140 to embedded end-point computer security facilities, may include a set of tools that may be the same for all enterprise implementations, but allow each enterprise to implement different controls. In embodiments, these controls may include both automatic actions and managed actions. Automatic actions may include downloads of the end-point computer security facility 152 to components of the enterprise facility 102, downloads of updates to existing end-point computer security facilities of the enterprise facility 102, uploaded network interaction requests from enterprise facility 102 components to the threat management facility 100, and the like. In embodiments, automatic interactions between the enterprise facility 102 and the threat management facility 100 may be configured by the threat management facility 100 and an administration facility 134 in the enterprise facility 102. The administration facility 134 may configure policy rules that determine interactions, such as developing rules for accessing applications, as in who is authorized and when applications may be used; establishing rules for ethical behavior and activities; rules governing the use of entertainment software such as games, or personal use software such as IM 162 and VoIP 164; rules for determining access to enterprise facility 102 computing resources, including authentication, levels of access, risk assessment, and usage history tracking; rules for when an action is not allowed, such as whether an action is completely deigned or just modified in its execution; and the like. The administration facility 134 may also establish license management, which in turn may further determine interactions associated with a licensed application. In embodiments, interactions between the threat management facility 100 and the enterprise facility 102 may provide threat protection to the enterprise facility 102 by managing the flow of network data into and out of the enterprise facility 102 through automatic actions that may be configured by the threat management facility 100 or the administration facility 134.

Client facilities 144 within the enterprise facility 102 may be connected to the enterprise facility 102 network by way of wired network facilities 148 or wireless network facilities 150. Client facilities 144 connected to the enterprise facility 102 network via a wired facility 148 or wireless facility 150 may receive similar protection, as both connection types are ultimately connected to the same enterprise facility 102 network, with the same end-point computer security facility 152, and the same threat protected enterprise facility 102 environment. Mobile wireless facility 150 clients 144, because of their ability to connect to any wireless 150 network access point, may connect to the internet 154 outside the enterprise facility 102, and therefore outside the threat-protected environment of the enterprise facility 102. In this instance the mobile client facility 144, if not for the presence of the end-point computer security facility 152 may experience a malware attack or perform actions counter to enterprise facility 102 established policies. In addition, there may be a plurality of ways for the threat management facility 100 to protect the out-of-enterprise facility 102 mobile client facility 144 that has an embedded end-point computer security facility 152, such as by providing URI filtering in personal routers, using a web appliance as a DNS proxy, or the like. Mobile client facilities 144 that are components of the enterprise facility 102 but temporarily outside connectivity with the enterprise facility 102 network, may be provided with the same threat protection and policy control as client facilities 144 inside the enterprise facility 102. In addition, mobile client facilities 144 may receive the same interactions to and from the threat management facility 100 as client facilities 144 inside the enterprise facility 102, where mobile client facilities 144 may be considered a virtual extension of the enterprise facility 102, receiving all the same services via their embedded end-point computer security facility 152.

Interactions between the threat management facility 100 and the components of the enterprise facility 102, including mobile client facility 144B-F extensions of the enterprise facility 102, may ultimately be connected through the internet 154. Threat management facility 100 downloads and upgrades to the enterprise facility 102 may be passed from the firewalled networks of the threat management facility 100 through to the end-point computer security facility 152 equipped components of the enterprise facility 102. In turn the end-point computer security facility 152 components of the enterprise facility 102 may upload policy and access requests back across the internet 154 and through to the threat management facility 100. The Internet 154 however, is also the path through which threats may be transmitted from their source. These network threats may include threats from a plurality of sources, including websites 158, e-mail 160, IM 162, VoIP 164, application software 168, and the like. These threats may attempt to attack a mobile enterprise client facility 144B-F equipped with an end-point computer security facility 152, but in embodiments, as long as the mobile client facility 144B-F is embedded with an end-point computer security facility 152, as described above, threats may have no better success than if the mobile client facility 144B-F were inside the enterprise facility 102.

However, if the mobile client facility 144 were to attempt to connect into an unprotected connection point, such as at a secondary location 108 that is not a part of the enterprise facility 102, the mobile client facility 144 may be required to request network interactions through the threat management facility 100, where contacting the threat management facility 100 may be performed prior to any other network action. In embodiments, the client facility's 144 end-point computer security facility 152 may manage actions in unprotected network environments such as when the client facility 144 is in a secondary location 108 or connecting wirelessly 150 to a non-enterprise facility 102 wireless internet 154 connection, where the end-point computer security facility 152 may dictate what actions are allowed, blocked, modified, or the like. For instance, if the client facility's 144 end-point computer security facility 152 is unable to establish a secured connection to the threat management facility 100, the end-point computer security facility 152 may inform the user of such, and recommend that the connection not be made. In the instance when the user chooses to connect despite the recommendation, the end-point computer security facility 152 may perform specific actions during or after the unprotected connection is made, including running scans during the connection period, running scans after the connection is terminated, storing interactions for subsequent threat and policy evaluation, contacting the threat management facility 100 upon first instance of a secured connection for further actions and or scanning, restricting access to network and local resources, or the like. In embodiments, the end-point computer security facility 152 may perform specific actions to remediate possible threat incursions or policy violations during or after the unprotected connection.

The secondary location 108 may have no end-point computer security facilities 152 as a part of its computer components, such as its firewalls 138, servers 142, clients 144, hubs 148, wireless hubs 150, and the like. As a result, the computer components of the secondary location 108 may be open to threat attacks, and become potential sources of threats, as well as any mobile enterprise facility clients 144B-F that may be connected to the secondary location's 108 network. In this instance, these computer components may now unknowingly spread a threat to other components connected to the network.

Some threats may not come directly from the Internet 154, such as from non-enterprise facility controlled mobile devices that are physically brought into the enterprise facility 102 and connected to the enterprise facility 102 client facilities 144. The connection may be made from direct connection with the enterprise facility's 102 client facility 144, such as through a USB port, or in physical proximity with the enterprise facility's 102 client facility 144 such that a wireless facility 150 connection can be established, such as through a Bluetooth connection. These physical proximity threats 110 may be another mobile computing device 172, a portable memory storage device, a mobile communications device, or the like, such as CDs and DVDs 170, memory stick, flash drive 174, external hard drive, cell phone 178, PDAs 180, MP3 players, digital cameras, point-to-point devices, digital picture frames, digital pens, navigation devices, appliances, and the like. A physical proximity threat 110 may have been previously infiltrated by network threats while connected to an unprotected network connection outside the enterprise facility 102, and when connected to the enterprise facility 102 client facility 144, pose a threat. Because of their mobile nature, physical proximity threats 110 may infiltrate computing resources in any location, such as being physically brought into the enterprise facility 102 site, connected to an enterprise facility 102 client facility 144 while that client facility 144 is mobile, plugged into an unprotected client facility 144 at a secondary location 108, and the like. A mobile device, once connected to an unprotected computer resource, may become a physical proximity threat 110. In embodiments, the end-point computer security facility 152 may provide enterprise facility 102 computing resources with threat protection against physical proximity threats 110, for instance, through scanning the device prior to allowing data transfers, through security validation certificates, through establishing a safe zone within the enterprise facility 102 computing resource to transfer data into for evaluation, and the like.

Now that the overall system has been described, we turn towards a set of virtual machine sharing embodiments. It should be understood that the following virtual machine sharing embodiments may be managed through a threat management facility 100 along with other services, such as those described herein.

A computer, such as the end-point client 144 or the server 142, is a physical computing machine 202, that is, it may act as a single processing entity, where there is a single operating system 210 on the machine, and which has all of the physical resources of the physical machine available for its use. However, a computer may also be partitioned or multiplexed into a plurality of virtual computing machines 204, where each virtual computing machine 204 runs its own operating system 210. One of the reasons for implementing a virtual computing machine 204 configuration is to establish multiple isolated virtual machines 204 on a single hardware platform, such as for quality of service offered to different enterprise customer servers operating on the same physical server 142, the ability to run different types of operating systems on a single platform, providing a unique instruction set architecture to one virtual machine verses another, and the like. In order to maintain isolation amongst these virtual machines 204, there is typically no sharing of information or software resources between the virtual computing machines 204. However, since all virtual computing machines 204 on a given physical computing machine 202 platform must ultimately share the same hardware resources, such as processing and physical memory 212 resources, there may be limits to how many virtual computing machines 204 may be accommodated on a single physical platform, especially in terms of security software and associated processing duplication for each virtual computing machine 204. For instance, a plurality of virtual computing machines 204 configured on a single physical computing machine 202 may each have their own copies of the end-point computer security facility 152, all running on the same physical computing machine 202, and competing for shared physical resources such as processing capability and physical memory. This may place real limitations on the capability of a single physical computing machine 202 in accommodating a large number of virtual computing machines 204. The current invention may enable an increase to the number of virtual computing machines 204 that may be accommodated on a single physical computing machine 202, as well as increasing the efficiency of the system's processes, through the use of a sharing facility 220, which may allow for the sharing of information and resources between virtual machines.

In embodiments, providing a sharing facility 220 associated with the use of a plurality of virtual computing machines 204, the present invention may enable greater efficiencies in the use of physical memory 212 and processing in order to increase the number of virtual computing machines 204 that may be accommodated with a single physical computing machine 202, decrease the overlap of software applications and processes, allow for the sharing of information between virtual computing machines 204 to increase the efficiency of malware detection methods, decrease the overlap of malware scanning amongst virtual computing machines 204 in order to decrease processing load, share system and application configuration and state information to provide greater system uniformity, and the like.

In embodiments, the present invention may also better enable a virtual computing machine monitor 208, amongst a plurality of virtual machines, to be used to isolate potentially harmful data, files, code, applications, interpretable content, and the like. For example and without limitation, a file may be scanned and determined to be potentially harmful. This file may then be isolated in a separate virtual computing machine 204 where additional scanning may be performed, or where behavior observation may be made. This virtual computing machine 204 may now act as a protective environment, where the other virtual computing machines 204 are protected through isolation of the file or process. In addition, the virtual computing machine 204 that initiated the isolation may now safely monitor shared information, such as state information, from outside the isolated virtual computing machine 204. This ability to create virtual computing machines 204 that act as a protective environment, coupled with shared information, may provide an increased security for potentially harmful files and processes.

Figure 2:
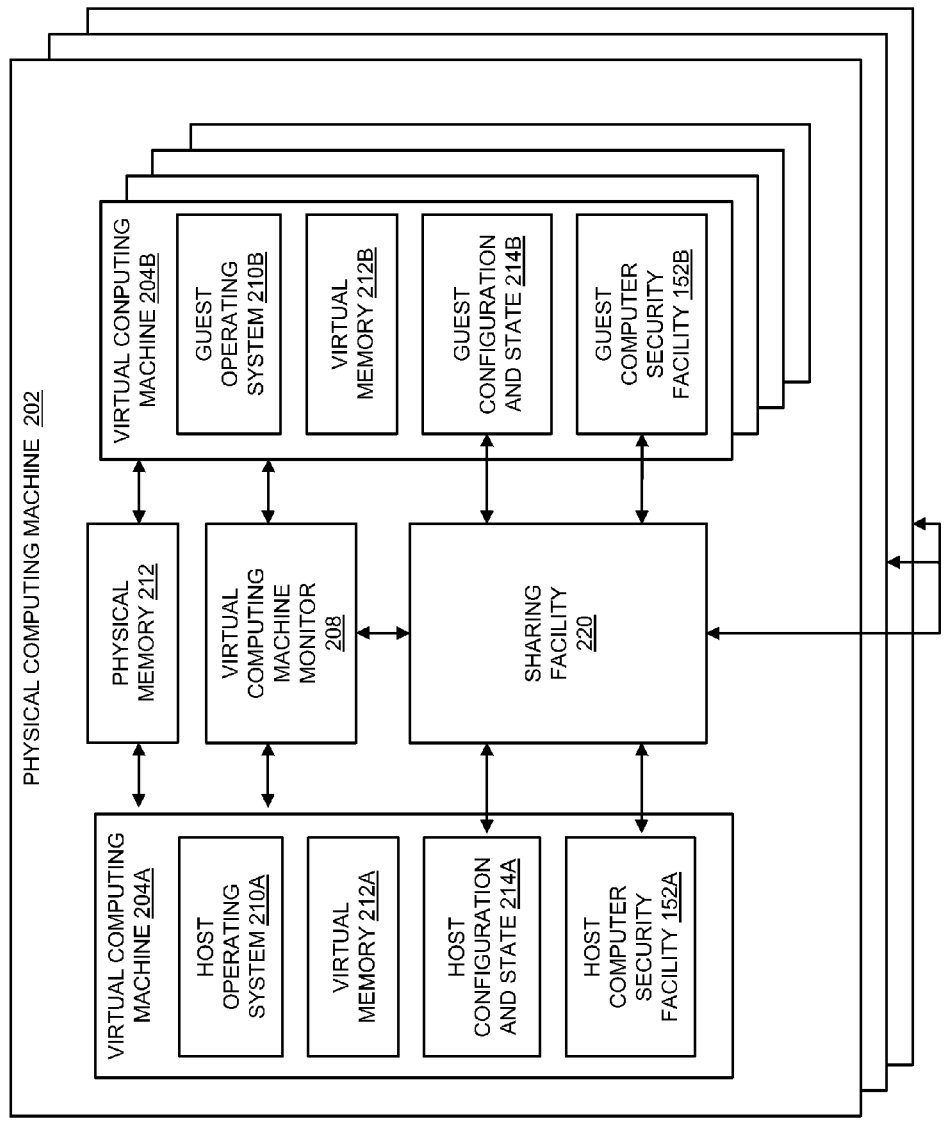
FIG. 2 shows an embodiment of a physical computing machine partitioned into virtual computing machines, including associated sharing and management facilities.

In embodiments, referring to FIG. 2 the physical computing machine 202 is illustrated. The physical computing machine may be a client 144 or a server 142 or some other type of computing device. The physical computing machine 202 may be connected to a network either through a wired or a wireless connection. Further, those skilled in art would appreciate that the physical computing machine 202 may include hardware, software, software applications, processes, procedure, in embodiments, described herein. Further it should be noted that the physical computing system 202 is shown to have only virtual machine 204A and virtual computing machine 204B. However, those skilled in the art would appreciate that physical computing system 202 may have a plurality of virtual computing machines. The virtual computing machine 204A and the virtual computing machine 204B may be a software implementation of a machine on a computer that may execute process like a real computer. The virtual computing machine 204A may include a host operating system 210A, a virtual memory 212A and a host configuration and state 214A. In addition, the virtual computing machine 204A may include a host computer security facility 152A.

The host operating system 210A may be a program loaded on to the computer during boot time and may control other programs, such as, applications, background processes, and the like. Further, those skilled in the art would appreciate that the host operating system 210A may be construed in an alternate way as known in the art. The host operating system 210A may be associated with the virtual memory 212A. The virtual memory 212A may hold instructions related to host operating system 210A. The virtual memory 212A may also hold information related to host configuration and state information 214A. The host configuration and state information 214A may store the information related to configuration such as operating system configuration information, firewall configuration, information application, configuration information, and the like. The host computer security facility 152A may hold information related to security of the virtual computing machine 204A such as detection of suspicious programs, malware detection, and the like.

The physical computing machine 202 may include another different virtual computing machine 204B that may run a guest operating system 210B. It may be noted that the virtual computing machine 204B may include one or more guest operation systems as shown in FIG. 2. Further, those skilled in the art would appreciate that physical computing machine 202 may include the host and multiple guests and the host may be randomly chosen from a number of multiple virtual computing machines or may be constituted in an alternate way as known in the art. The virtual computing machine 204B may include a guest operating system 210B, a virtual memory 212B, a guest configuration and state 214B and a guest computer security facility 152B, and the like.

The guest operating system 210B may run a different operating system with respect to host operating system 210A. In addition, the guest operating system 210B may store program instructions specific to it in the virtual memory 212B. The virtual memory 212B may store configuration and state information specific to the virtual computing machine 204B. In addition, the virtual memory 212B may be associated with the guest configuration and state facility 214B. The guest configuration and state facility 214B may be associated with the guest computer security facility 152B. The guest computer security facility 152B may store the information related to malware and access control.

The virtual computing machine 204A and the virtual computing machine 204B may share a common physical memory 212. The common physical memory 212 may store process information of programs associated with the virtual computing machine 204A and the virtual computing machine 204B. The process information may be processing time of a processing resource, removal of processing requirement of the virtual computing machines 204A and 204B, and the like. In embodiments, the virtual computing machine 204A and the virtual computing machine 204B may be associated with the virtual computing machine monitor 208. The virtual computing machine monitor 208 may provide a software layer which may implement virtualization for running multiple virtual computing machines. For example, the virtual computing machine monitor 208 may provide the software layer for the virtual computing machine 204A and the virtual computing machine 204B.

In embodiments, the virtual computing machine 204A and the virtual computing machine 204B may be associated with the sharing facility 220. The sharing facility 220 may provide sharing information between the virtual computing machine 204A and the virtual computing machine 204B. The sharing facility 220 may be a software program.

Figure 3:
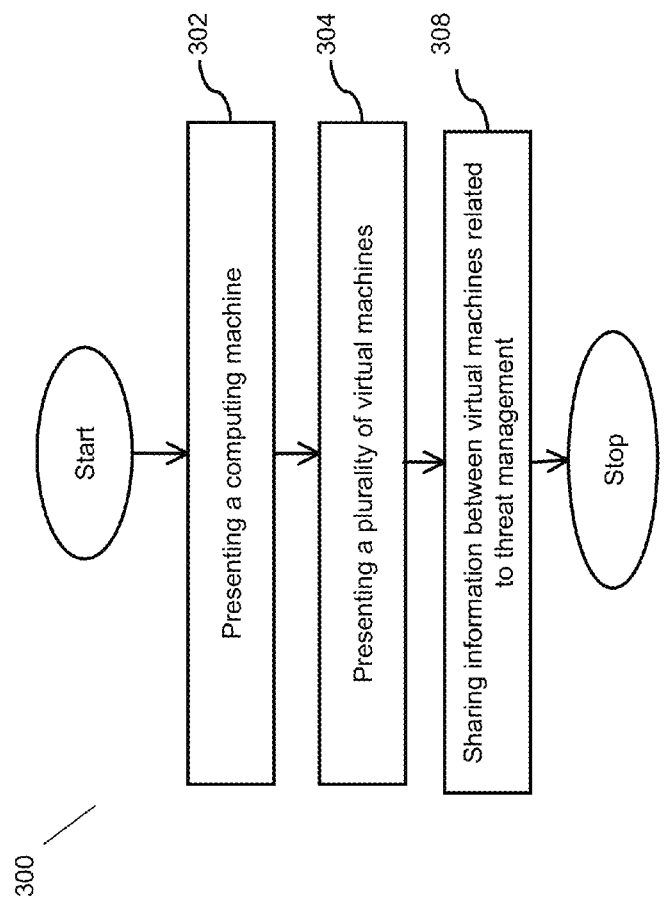
FIG. 3 shows an embodiment of a flow chart for sharing information of a threat management facility.

Referring to FIG. 3, a process 300 may initiate a method to share information related to threat management. At logical block 302, the physical computing machine 202 may be presented. For example, the physical computing machine 202 may include the virtual computing machine 204A and 204B. In addition, each of the virtual computing machines 204A and 204B may be associated with their respective operating system 210A and 210B. In embodiments, the virtual computer machine monitor 208 may be a hypervisor. In embodiments, the virtual computer machine monitor 208 may be a software program which may provide virtualization of virtual computing machine 204A and virtual computing machine 204B. In embodiments, the virtual computing machine monitor 208 may run directly on the physical computing machine 202. The physical computing machine 202 may be a client or a server. In embodiments, the virtual computing machine monitor 208 may run in association with the operating system.

At logical block 304, the virtual computing machine 204A may be presented as the host and the virtual computing machine 204B may be presented as the guest, amongst a plurality of virtual computing machines 204

Further, it should be noted that at logical block 304, the virtual computing machine 204A may be presented as the host and the virtual computing machine 204B may be presented as the guest. However, those skilled in the art would appreciate that the virtual computing machine 204A may be presented as the guest and the virtual computing machine 204B may be presented as the host. In addition, one of the multiple virtual computing machines may be presented as a host and the remaining multiple virtual machines may presented as the guest.

At logical block 308, the information related to threat management maybe shared. For example, the information related to threat management may be shared between the host virtual computing machine 204A and the guest virtual computing machine 204B. In embodiments, the information related to threat management may be provided by the threat management facility 100. In embodiments, the information may be shared through the sharing facility 220. In embodiments, the sharing facility 220 may be a software program associated with an allocated memory. The allocated memory may not be a part of the physical memory. The physical memory may be allocated to the host virtual computing machine 204A. In embodiments, the sharing facility 220 may communicate the shared information directly between the virtual computing machine 204A and the virtual computing machine 204B.

In embodiments, the software program may run on the host virtual computing machine 204A. In embodiments, the software program may run on a separate physical computing machine. The separate physical machine may have all the functionality similar to the physical computing machine 202.

In embodiments, the sharing of information between the virtual computing machine 204A and the virtual computing machine 204B may conserve a resource of any of virtual computing machine 204A and the virtual computing machine 204B. In embodiments, the resource may be conserved through a consolidated memory usage. The memory may be a physical memory, which may be allocated to the virtual memory 212A or to the virtual memory 212B. In embodiments, the resource may be conserved by a processing resource. The processing resource may be a processing time. In embodiments, the processing resource may be removed. The removed processing resource may be a part of any of the virtual computing machine 204A or the virtual computing machine 204B. In embodiment, the resource may be a reduction of the processing requirement.

In embodiments, the sharing information may be associated with a computer security facility 152. The computer security facility 152A and 152B may run in minimized form or as a background process within the virtual computing machines 204A and 204B respectively. The computer security facility 152 may be provided in part from outside the virtual computing machine 204A. In embodiments, computer security may not be eliminated from one or more virtual computing machines. The computer security facility 152 may be provided from outside the virtual computing machine 204A or 204B. A client firewall may be associated with the computer security facility 152. The client firewall may run as background process in a minimized form. In embodiments, the client firewall may be provided from outside the virtual computing machine 204A or 204B. In embodiments, the client firewall may be eliminated completely from the virtual computing machine 204A and 204B. In addition, the client firewall may be provided from outside the virtual computing machine 204A.

In embodiments, the computer security facility 152 may be associated with network access control. The network access control may be related to securing the virtual computing machine 204A and the virtual computing machine 204B prior to a network connection. In addition the network access control may run as a background process or in minimized form within the virtual computing machine 204A and the virtual computing machine 204B. When the network access control runs in minimized form in the virtual computing machine 204A or the virtual computing machine 204B, the network access control may be provided in part or in full from outside the physical computing machine 202. In embodiments, the network access control may be completely eliminated from the virtual computing machine 204A or the virtual computing machine 204B. The network access control may then be provided from outside the virtual computing machine 204A or the virtual computing machine 204B.

In embodiments, the sharing information may be associated with malware security and control. The malware security and control may not be included in the virtual computing machine 204A or the virtual computing machine 204B. In embodiments, the malware security and control scanning time may be reduced by offsetting the scan related to the virtual computing machine 204A or the virtual computing machine 204B. In embodiments, security and control scan results may be shared between the virtual computing machine 204A and the virtual computing machine 204B.

In embodiments, the virtual computing machine 204A may not replicate scanning, if it has been executed on the virtual computing machine 204B. For example, if the host computer security facility 152A has performed scanning of files, then the scanning information may be shared with guest computer security facility 152B. In this case, the guest computer security facility 152B may not rescan files and may utilize the shared information received from the host computer security facility 152A.

In embodiments, the shared information may be associated with the configuration information. In embodiments, the configuration information may be associated with firewall configuration information. The firewall configuration information may be associated with an application rule, a firewall rule, a quarantine rule, a network bridge, a network access or some other type of firewall configuration information.

In embodiments, the shared information may be associated with an operating system configuration information. In embodiments, the operating system configuration information may be associated with process management, memory management, a disk or file systems, networking security, a graphical user interface, a device drivers or some other type of operating system configuration information.

In embodiments, the shared information may be associated with application configuration information. In embodiments, the application configuration information may be associated with enterprise software, enterprise infrastructure software, information software, content access software, simulation software, educational software, development software, engineering software, or some other type of application software.

In embodiments, the shared information may be associated with shared settings. In embodiments, the shared setting may enable identical firewall settings for the virtual computing machines 204A and the virtual computing machines 204B. In embodiments, shared settings may enable identical configuration settings for the virtual computing machines 204A and 20B. The identical configuration settings may be set upon the creation of the virtual computing machine 204A and the virtual computing machine 204B. In embodiments, the identical configuration setting may be set based on configuration changes to the host virtual computing machine 204A. In addition, the configuration changes may be associated with a policy management facility 112.

In embodiments, the shared setting may be associated with a computer security facility 152, a client firewall, a network access control, or some other type of shared settings. In addition, the network access control may secure the virtual computing machine 204A and the virtual computing machine 204B prior to making a network connection. In embodiments, the sharing information may be associated with the host configuration and state information 214A and guest configuration and host information 214B. In embodiments, the host configuration and state information 214A and guest configuration and state information 214B may be associated with scanned files. In embodiments, the scanned files may be scanned from outside the virtual computing machine 204A or the he virtual computing machine 204B. In embodiments, the scanned files may be scanned from inside the virtual computing machine 204A or the he virtual computing machine 204B.

In embodiments, the host configuration and state information 214A and guest configuration and state information 214B may be associated with security and control information. The security and control information may be associated with a file system which may be common between the virtual computing machine 204A and the virtual computing machine 204B.

In embodiments, the host configuration and state information 214A and guest configuration and state information 214B may be associated with an operating system. In embodiments, the operating system state information may be derived by comparing host operating system 210A state and the guest operating system 210B state.

In embodiments, the host configuration and state information 214A and guest configuration and state information 214B may be associated with an application software, with a software testing, and the like.

In embodiments, the sharing of information may be associated with malware detection information. The malware information may detected by examination of files, identification of suspicious behavior from a computer program, identification of one or more virus, worm, phishing attacks, rootkits, Trojan horses, spyware, malware and the like. In embodiments, the examination of files may be associated with a malware dictionary. The malware dictionary may compare values from files against entries in the malware dictionary to detect malware information. In embodiments, the malware detection associated with examination of files may be related with repairing of files, quarantining of files, deleting of files, scanning of files and the like. In embodiments, the malware detection information may be based on identification of suspicious behavior of a computer program. The identification of suspicious behavior may include monitoring the computer program.

Figure 4:
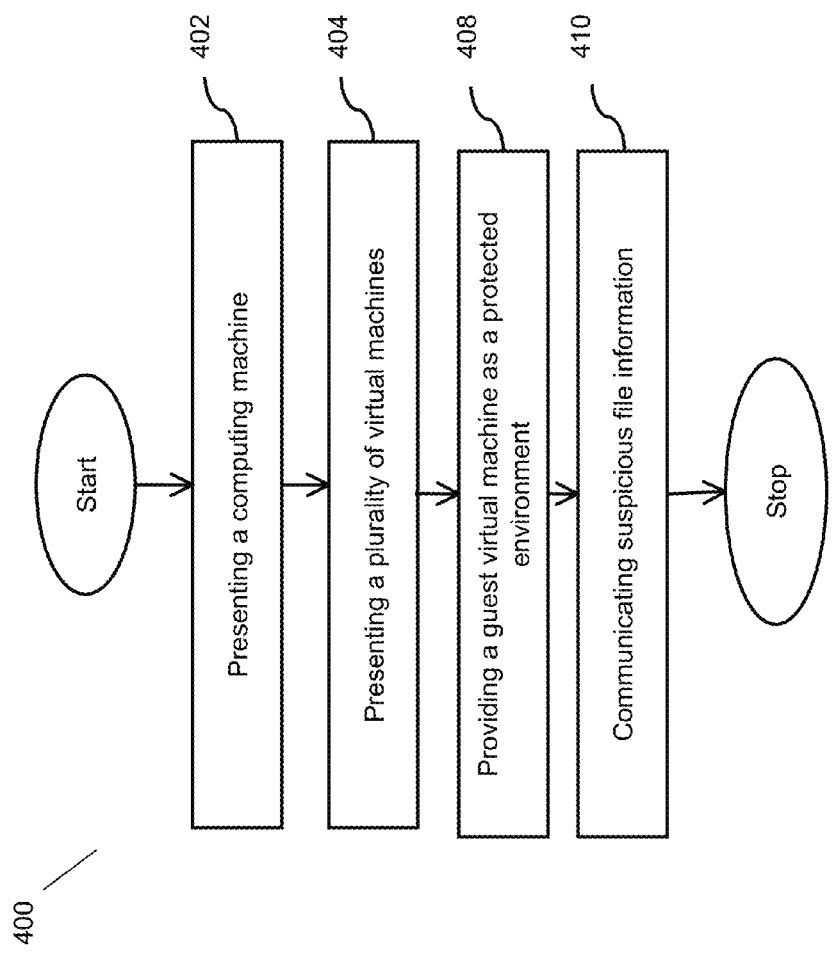
FIG. 4 shows an embodiment of a flow chart for isolating suspicious information in a protected environment using virtual machines.

Referring to FIG. 4, in embodiments, the process 400 may start with a logical block 402, where the physical computing machine may include a virtual computer machine monitor and a plurality of computer machines. Each of the plurality of virtual computer machines may run its own operating system. The process 400 may run the virtual computing machine 204A and the virtual computing machine 204B on a physical computing machine 202. The virtual computing machine 204A and the virtual computing machine 204B may run the host operating system 210A and the guest operating system 210B respectively. At logical block 404, one of the plurality of virtual computing machines 204A may be presented as the host and the virtual computing machines 204B may be presented as the guest. Further, those skilled in the art may appreciate that any one of the virtual computing machines may be presented as host and the remaining machines may be presented as guests. In embodiments, the virtual computing machine 204A or the virtual computing machine 204B may act as a sandbox. In embodiments, the sandbox may provide an execution environment for running a program code. In embodiments, the sandbox may run an executable code in the form of a simulation on the virtual computing machine 204B. In embodiments, when a simulation is terminated on the virtual computing machine 204B errors may be identified or changes may be searched and analyzed for indication of malware. Further, those skilled in the art would appreciate, that the virtual computing machine 204A may act as the host and the virtual computing machine 204B may act as the guest or the virtual computing machine 204A may act as the guest and virtual computing machine 204B may act as the host or the machines may use any other configuration known in the art.

At logical block 408, the process 400 may provide for one of the plurality of virtual computing machine 204B as a protected environment. The protected environment may be used to isolate suspicious files that may have malware associated with them. For example, the protected environment provided by the virtual computing machine 204B may be used to isolate suspicious files from the virtual computing machine 204A and other guest virtual computing machines. In embodiments, the protected environment provided by the virtual computing machine 204B may be used by the testing facility 118 for testing purposes.

In embodiments, the protected environment may be associated with malware detection. In addition, the isolated files may be observed for a period of time. In embodiments, the protected environment may be launched to scan a file. In embodiments, the malware detection may be associated with the examination of files. The examination of files may be related to repairing the file, deleting the file, quarantining the file, examination of files against malware dictionary of know malwares, or some other type of examination on files. In addition, the malware dictionary may be associated with a comparison between values from file and the entities in the malware dictionary.

In embodiments, the malware detection may be related to identification of suspicious behavior of the computer program or malware detection information that may be related to detection of one or more virus, worm, phishing attacks, rootkits, Trojan horses, spyware, malware and the like. The identification of suspicious behavior may include monitoring of the suspicious nature of the computer program.

At block 410, the process 400 may communicate the suspicious information from the virtual computing machine 204A to the virtual computing machine 204B providing the protected environment for isolation. Further, those skilled in the art would appreciate that any of the virtual computing machine 204A or the virtual computing machine 204B may act as the guest and may provide a protected environment.

Furthermore, those skilled in the art would appreciate that the embodiments described herein may be constituted in an alternate way.

In embodiments, the information may be shared between virtual computing machine 204A and the virtual computing machine 204B providing protected environment. Further, those skilled in the art would appreciate that the information may be shared between any of the guest computing machines or the configuration can be constituted in an alternate way as known in the art. In embodiments, the virtual computing machine 204B may be on a different physical computing machine other than the physical computing machine 202. The information shared between the virtual computing machine 204B providing the protected environment and the virtual computing machine 204A may be related to state information. In embodiments, the state information shared between the virtual computing machine 204B providing the protected environment and the physical computing machine 202 may be associated with scanned files. The scanned files may be scanned from inside or outside the virtual computing machine 204A or the virtual computing machine 204B.

An aspect of the present invention relates to improved methods, systems and products for the security of virtual machines. In embodiments, several virtual machines may be resident on a server (e.g. server 142A). The server may also have a resident computer security facility (e.g. computer security facility 152, which may be implemented as a computer software product designed for the monitoring and maintenance of the security on the server). The resident computer security facility 152 may include software components embodied on computer readable media that implement a process through which a disk on which the virtual machine(s) are operated is monitored for write or otherwise change activity. The entire physical disk may be monitored, or only those positions of the disk, or subsets of those positions, that are associated with virtual machines may be monitored. Once activity is noted, the active section may be associated with a particular virtual machine. That is, which virtual machine is operating or controlling the newly active site on the disk. The newly active site may then be associated with data, such as a file, application, code, interpretable content, or other form of software, such that it can be scanned or otherwise managed for security purposes. A dirty cluster map may be updated with any newly active sites. Once activity has been noted and the activity has been associated with a virtual machine and/or data under the control of the virtual machine, the computer security facility 152 can manage the virtual machine and/or the data. For example, once activity is noted, the virtual machine may itself be scanned or cause an internal security procedure. In other embodiments, the data may be scanned or the virtual machine may be caused to scan the data. The scans may be on-demand, on-access, or other forms of scans.

In an embodiment, a system, a method, and a computer program product for tracking modified files on a virtual machine 204 may include tracking modified clusters in the virtual machine 204 image. Tracking modified clusters in the virtual machine 204 image may be useful for at least on-access scanning of virtual machines 204 and the data, files, applications, interpretable content, and code which they possess, to identify viruses, malware, threats, and the like. When an application requires information regarding which parts of a virtual machine 204 may have been changed at the file level—as opposed to the sector/cluster level—, such as for the purpose of on-access scanning, on-demand scanning, backing up, data at rest, and the like, a set of "modified clusters" may be converted into a set of "modified files" using per-file occupation information provided by the file system. In embodiments, the conversion may be done rapidly to satisfy real-time requirements.

In an embodiment, tracking modified files on a virtual machine 204 may be generalized as to the virtualization technology and may be performed independently of specific APIs to give visibility in to the virtual machine 204. The method may be performed at the file level alone from a system that has no connection to the virtualization capability itself. This method may be applied widely to any process that needs to regularly check data inside a virtual machine 204 and may improve the performance and efficiency of the scan proportionally to the data that does not change, which is typically the majority.

In an embodiment, tracking modified files on a virtual machine 204 addresses a performance problem in on-access scanning of virtual machine 204 images. For example, virtual machines 204 may be protected from malware the same way as physical machines, but a detection agent installed on each virtual machine 204 poses a performance problem for the virtual machines 204 due to memory footprint. The computer security facility 152 may perform on-access and on-demand scans in order to scan virtual machine 204 images, such as for purposes of threat protection, compliance, data control, and the like. Typically, the virtual machine 204 image is considered as an archive file, and is scanned as such. While this may be acceptable for on-demand scans, it is inefficient for on-access scans, since scanning performance may result in a delay in opening the virtual machine 204 of several tens of minutes. Alternatively, the systems, methods and computer program products described herein operate on the assumption that it may be acceptable to perform a detailed scan once for the virtual machine 204, namely the first time a virtual machine 204 image is encountered.

In an embodiment, tracking modified files on a virtual machine 204 may be based on the presence of a "dirty cluster map". The dirty cluster map may be a file that holds information about modified clusters in the virtual image. In an embodiment, the computer security facility 152 residing on a server 142, which may include an on-access scanner, may intercept "write" operations on the virtual machine 204 and mark modified clusters in the "dirty cluster map" as "dirty". In most cases, scans of unmodified files may not be necessary.

Figure 5:
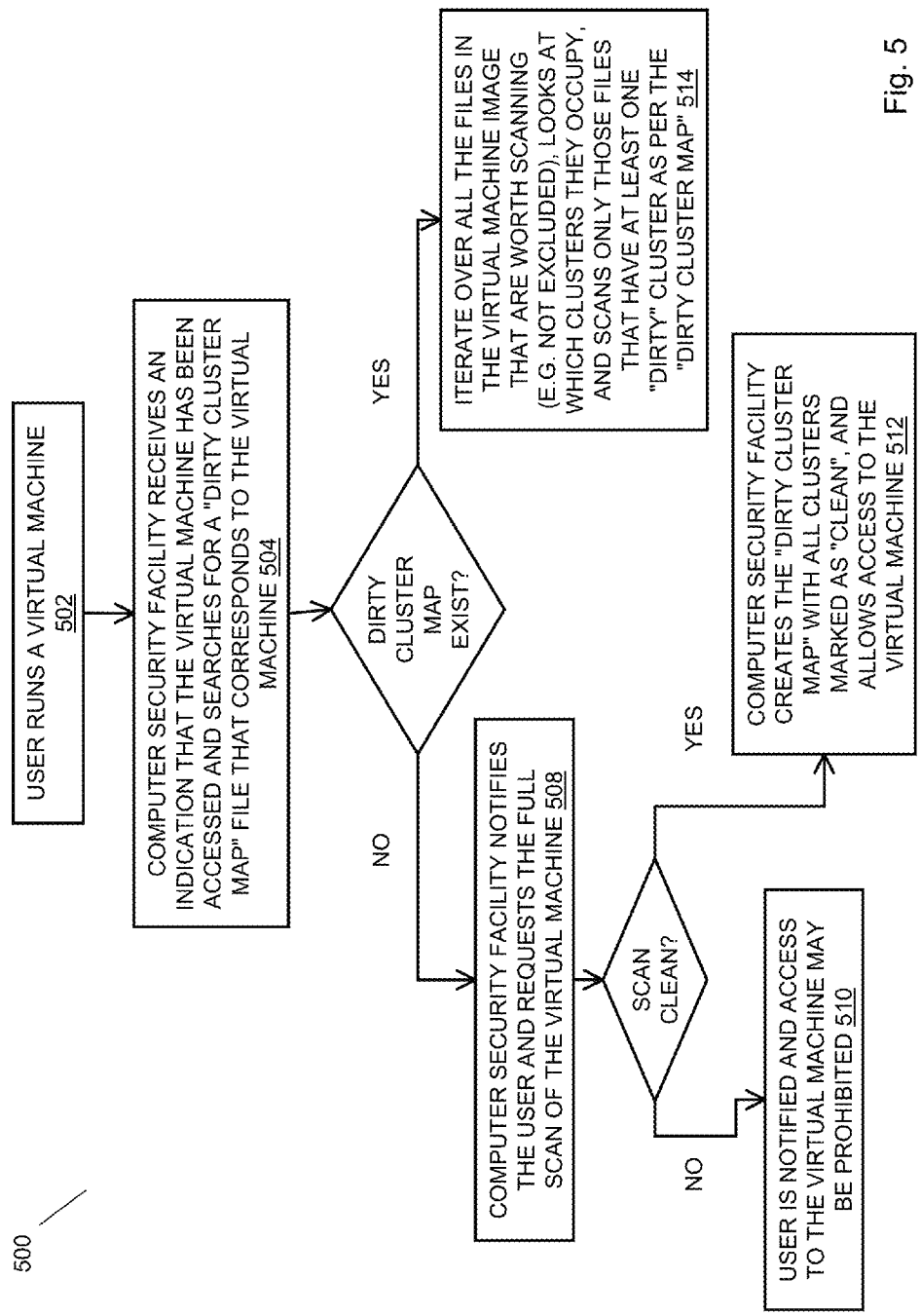
FIG. 5 shows an embodiment of a flow chart for tracking modified files on a virtual machine.

Referring to FIG. 5, in embodiments, the process 500 may start with a logical block 502, where a user may run a virtual machine 204. This may entail a user's initiation of an executable file with the virtual machine, selection of a file in the virtual machine, or some other action that requires performance from the virtual machine. At logical block 504, the computer security facility 152 (e.g. security code resident on a server 142 that includes one or more virtual machines) may receive an indication that the virtual machine 204 has been accessed and searches for a "dirty cluster map" file that corresponds to the virtual machine 204. The computer security facility 152 may store the dirty cluster maps on the server 142. At logical block 508, if no dirty cluster map file has been created yet, the computer security facility 152 may notify the user and request a full scan of the virtual machine 204 image. In an embodiment, the computer security facility 152 may automatically begin the scan, such as in accordance with an established policy 112 of the threat management facility 100. The user may be notified that a scan is in progress, and may also be notified about any malware found. If the user allows the scan to proceed, and any malware is found on the virtual machine 204 image, at logical block 510, the user is notified and access to the virtual machine 204 may be prohibited or some other remedial action may be initiated. If the virtual machine 204 is clean, at logical block 512 the computer security facility 152 may create the "dirty cluster map" with all clusters marked as "clean", and allow access to the virtual machine 204. If a "dirty cluster map" already exists, the scan may be optimized. At logical block 514, the optimization is described. The computer security facility 152 can use the "dirty cluster map" to optimize the scan by iterating over all the files in the virtual machine 204 image that are worth scanning (e.g. not excluded), and looking at which clusters they occupy, Then, it scans only those files that have at least one "dirty" cluster as per the "dirty cluster map". While the virtual machine is running, the computer security facility 152 may monitor all writes to the virtual machine 204 image. Whenever a part of a cluster is written to, this cluster is marked as "dirty" in the "dirty cluster map". As the scan is optimized, the user need not be asked to perform the scan, thus, the scan may proceed automatically. If any malware is found, it may be reported, and access to the virtual machine 204 image may be prohibited. Otherwise, all the clusters in the "dirty cluster map" may get marked as "clean" and access may be allowed. This process 500 may result in significantly less scanning than prior methods for on-access scanning.

In an embodiment, the "dirty cluster map" may be tamper-proof to deter users from tampering with it in order to trick the computer security facility 152 into thinking that it is clean. The "dirty cluster map", residing on a server 142 of the enterprise facility 102, may be associated with a policy 112, so that if the virtual machine 204 is copied within the enterprise facility 102, such as to machines that have the same antivirus policy 112, it may immediately be recognized, while outside of this scope the "dirty cluster map" may be rejected and re-generated.

In an embodiment, for long-running virtual machines 204, there may be a need to periodically perform the scan. The computer security facility 152 may postpone any write operations to the virtual machine 204 image while performing an optimized scan. The only difference from a normal optimized scan, at virtual machine 204 start, may be that it does not make sense to either (1) block access to the virtual machine (i.e. malware can be only reported), or (2) try to disinfect the virtual machine 204, since this may interfere with the operation of the virtual machine 204 itself. If these options are needed for the long-running virtual machine 204, it may be specified by a policy 112.

In an embodiment, computer security facility 152 parameters (e.g. identities) may receive updates 120, such as from the threat management facility 100, on recent threats. The "dirty cluster map" may be used to monitor which clusters have been modified "recently", so the corresponding files can get rescanned after the update 120. What "recently" means may be implementation-dependent. For example, the computer security facility 152 may provide protection in less than 24 hours after a new threat emerges. The "dirty cluster map" may be used to monitor files modified in the last 24 hours in accordance with this implementation.

In an embodiment, how the file structure on the virtual machine 204 is interpreted for the purpose of (1) finding clusters for files, and (2) scanning the files may be done through a custom library, such as one which may provide R/W or R/O access to the file system, or by mounting the virtual machine 204 as a disk device and using the operating system support for file systems. For example, if the Windows OS support is used, the defragmentation API can be used to get the list of clusters for each file.

In an embodiment, tracking modified files on a virtual machine 204 may be applied to other purposes in addition to on-access scanning of virtual machines 204 for viruses. Other applications may need to know which files on a virtual machine 204 have changed since a given checkpoint. For example, a data at rest application could perform an external scan of the virtual machine 204 image, looking for confidential data only in those files that have been created or modified since the last check.

In an embodiment, tracking modified files on a virtual machine 204 may also be applied to optimization of on-demand scans in the case of complex virtual machines 204 images based on snapshots. Snapshots may be linked so that more than one virtual machine 204 (snapshot) uses the same base image. In the "virtual desktop" case, thousands of virtual machines 204 (desktops) may get created from a single base image. A "standard" on-demand scan of those images would scan each of the virtual machines 204 in turn, resulting in the files contained wholly in the base image being scanned multiple times. A better approach is to check which files of the base image have been modified by the snapshot (regarding the snapshot as equivalent to the "dirty cluster map"), and scanning only them. This approach may remove unnecessary duplication.

Figure 6:
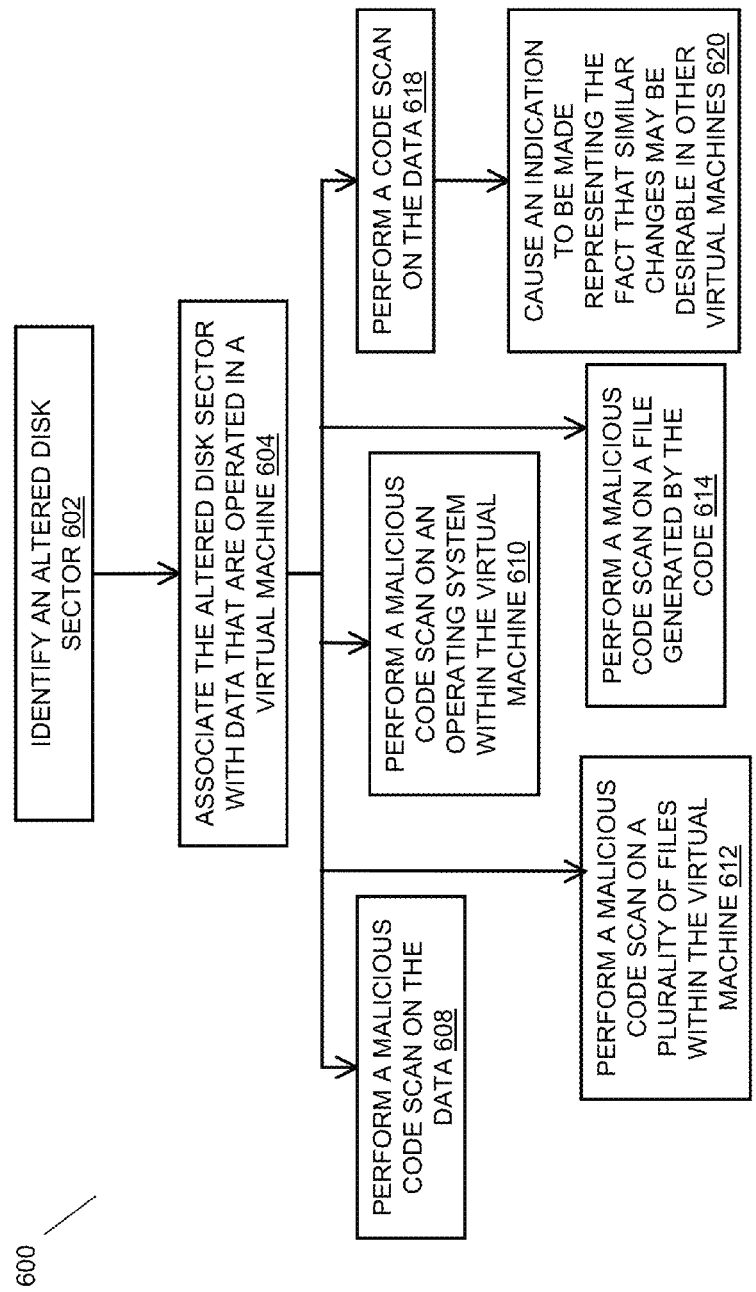
FIG. 6 shows an embodiment of a flow chart for tracking modified files on a virtual machine.

Referring to FIG. 6, a process 600 including at least one of a system, a method and computer program product embodied in a computer readable medium that, when executing on one or more computers, may perform the steps of identifying an altered disk sector 602 and associating the altered disk sector with data, such as a file, application, code, interpretable content, or other form of software, that are operated in a virtual machine 604. Identifying an altered disk sector 602 may include monitoring the entire physical disk, or only those positions of the disk, or subsets of those positions, that are associated with virtual machines. In some embodiments, the process 600 may include causing a malicious code scan to be performed on the data, such as a file, application, code, interpretable content, or other form of software 608. In some embodiments, the process 600 may include causing a malicious code scan to be performed on an operating system within the virtual machine 610 based at least in part of finding that the data have been corrupted by malicious code. In some embodiments, the process 600 may include causing a malicious code scan to be performed on a plurality of files within the virtual machine 612 based at least in part on a finding that code has been corrupted by malicious code. In some embodiments, the process 600 may include causing a malicious code scan to be performed on a file generated by the code 614. The file generated by the code may be within the virtual machine. The file generated by the code may be outside of the virtual machine. In order to tie files created outside of the virtual machine to the code that generated them inside, the virtualization software file transfer logs may need to be updated. For example, the file may need to be noted as having been moved from location A to location B at a particular time. In some embodiments, the process 600 may include causing a code scan to be performed on the data 618. In response to identifying that an acceptable change has been made to the data, the process 600 may further include causing an indication to be made representing the fact that similar changes may be desirable in other virtual machines 620. Multiple replica virtual machines may exist on a platform and the indication of the acceptable change in one virtual machine may indicate that the same change should be made in other replica virtual machines. In the process 600, the step of identification may be performed by examination of a dirty cluster map. In the process 600, the data may be at least one of a file, an executable file, a software application, interpretable content, code, or other form of software. The dirty cluster map may be a file that holds information about modified clusters on the virtual machine.

The methods and systems described herein may be deployed in part or in whole through a machine that executes computer software, program codes, and/or instructions on a processor. The present invention may be implemented as a method on the machine, as a system or apparatus as part of or in relation to the machine, or as a computer program product embodied in a computer readable medium executing on one or more of the machines. The processor may be part of a server, client, network infrastructure, mobile computing platform, stationary computing platform, or other computing platform. A processor may be any kind of computational or processing device capable of executing program instructions, codes, binary instructions and the like. The processor may be or include a signal processor, digital processor, embedded processor, microprocessor or any variant such as a co-processor (math co-processor, graphic coprocessor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more threads. The thread(s) may spawn other threads that may have assigned priorities associated with them; the processor may execute these threads based on priority or any other order based on instructions provided in the program code. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer software on a server, client, firewall, gateway, hub, router, or other such computer and/or networking hardware. The software program may be associated with a server that may include a file server, print server, domain server, internet server, intranet server and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the invention. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the invention. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The methods, program codes, and instructions described herein and elsewhere may be implemented on a cellular network having multiple cells. The cellular network may either be frequency division multiple access (FDMA) network or code division multiple access (CDMA) network. The cellular network may include mobile devices, cell sites, base stations, repeaters, antennas, towers, and the like. The cell network may be a GSM, GPRS, 3G, EVDO, mesh, or other networks types.

The methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer to peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipments, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

While the invention has been disclosed in connection with the preferred embodiments shown and described in detail, various modifications and improvements thereon will become readily apparent to those skilled in the art. Accordingly, the spirit and scope of the present invention is not to be limited by the foregoing examples, but is to be understood in the broadest sense allowable by law.

All documents referenced herein are hereby incorporated by reference.

What is claimed is:

1. A computer program product embodied in a non-transitory computer readable medium that, when executing on one or more computers, performs the steps of:
    identifying one or more positions in a physical memory associated with a virtual machine;
    detecting a write operation to at least one of the one or more positions;
    tracking the write operation in a cluster map that holds information about one or more modified clusters of the physical memory;
    converting the one or more modified clusters of the physical memory to a set of modified files for a file system of the virtual machine using per-file occupation information provided by the file system;
    identifying at least one file on the virtual machine from the set of modified files for the file system;
    receiving an on-access request for the virtual machine; and
    scanning the virtual machine prior to access to the virtual machine using the physical memory independently of any specific application programming interfaces (APIs) for the virtualization technology, wherein scanning includes performing a scan of the at least one file at the file level with a facility independent of a virtualization capability used to manage the virtual machine, and wherein scanning includes using the set of modified files to limit a scan to a portion of the physical memory containing the at least one file.

2. The computer program product of claim 1 wherein the at least one file includes an operating system file.

3. The computer program product of claim 1 wherein the at least one file includes a plurality of files.

4. The computer program product of claim 1 wherein the scan evaluates whether the at least one file includes data corrupted by malicious code.

5. The computer program product of claim 1 wherein the scan evaluates whether the at least one file includes malicious code.

6. The computer program product of claim 1 wherein the scan evaluates the at least one file for a presence of confidential data.

7. The computer program product of claim 1 wherein detecting the write operation includes detecting the write operation within the virtual machine.

8. The computer program product of claim 1 wherein detecting the write operation includes detecting the write operation to a memory location of the physical memory independent from the virtual machine.

9. The computer program product of claim 1 wherein the physical memory includes a disk drive.

10. The computer program product of claim 1 wherein the at least one file includes program data.

11. The computer program product of claim 1 wherein the at least one file includes an executable file.

12. The computer program product of claim 1 wherein the at least one file includes interpretable content.

13. The computer program product of claim 1 wherein the cluster map is tamper proof.

14. The computer program product of claim 1 wherein the at least one file is within the virtual machine.

15. The computer program product of claim 1 wherein the at least one file is outside the virtual machine.

16. The computer program product of claim 1 further comprising code that performs the steps of performing a full scan of the virtual machine and marking every cluster of the cluster map as clean.

17. The computer program product of claim 1 further comprising code that performs the step of performing a remedial action on the at least one file.

18. The computer program product of claim 1 wherein the cluster map resides on a server hosting a security policy for an enterprise, the cluster map being copied for one or more copies of the virtual machine within the enterprise.

* * * * *